United States Patent
Griffith et al.

(10) Patent No.: US 11,620,301 B2
(45) Date of Patent: Apr. 4, 2023

(54) EXTENDED COMPUTERIZED QUERY LANGUAGE SYNTAX FOR ANALYZING MULTIPLE TABULAR DATA ARRANGEMENTS IN DATA-DRIVEN COLLABORATIVE PROJECTS

(71) Applicant: data.world, Inc., Austin, TX (US)

(72) Inventors: David Lee Griffith, Austin, TX (US); Shad William Reynolds, Austin, TX (US); Bryon Kristen Jacob, Austin, TX (US)

(73) Assignee: data.world, Inc., Austin, TX (US)

( * ) Notice: Subject to any disclaimer, the term of this patent is extended or adjusted under 35 U.S.C. 154(b) by 0 days.

(21) Appl. No.: 17/332,354

(22) Filed: May 27, 2021

(65) Prior Publication Data

US 2021/0397626 A1     Dec. 23, 2021

Related U.S. Application Data

(63) Continuation of application No. 16/036,834, filed on Jul. 16, 2018, now Pat. No. 11,042,560, which is a continuation-in-part of application No. 15/186,514, filed on Jun. 19, 2016, now Pat. No. 10,102,258, and a continuation-in-part of application No. 15/186,516, filed on Jun. 19, 2016, now Pat. No. 10,452,677, and a continuation-in-part of application No. 15/454,923, (Continued)

(51) Int. Cl.
    *G06F 16/25*      (2019.01)
    *G06F 16/248*     (2019.01)
    *G06F 16/22*      (2019.01)
    *G06F 16/242*     (2019.01)

(52) U.S. Cl.
    CPC .......... *G06F 16/25* (2019.01); *G06F 16/2282* (2019.01); *G06F 16/248* (2019.01); *G06F 16/2445* (2019.01)

(58) Field of Classification Search
    None
    See application file for complete search history.

(56) References Cited

U.S. PATENT DOCUMENTS 11,042,556 B2 *   6/2021   Griffith  ............... G06F 16/2471
11,042,560 B2 *   6/2021   Griffith  ............... G06F 16/2445
(Continued)

*Primary Examiner* — Kim T Nguyen
(74) *Attorney, Agent, or Firm* — Kokka & Backus, PC

(57) ABSTRACT

Various embodiments relate generally to data science and data analysis, computer software and systems, and wired and wireless network communications to interface among repositories of disparate datasets and computing machine-based entities configured to access datasets, and, more specifically, to a computing and data storage platform configured to provide one or more computerized tools that facilitate development and management of data projects, including implementation of extended computerized query language syntax to analyze, for example, multiple tabular data arrangements in data-driven collaborative projects. For example, a method may include generating data to present a query editor in a data project interface, receiving data representing a first query command to select one or more subsets of data, identifying in the data representing a second query command a subset of datasets from which to extract the data, and applying a query based on a first query command and a second query command.

19 Claims, 11 Drawing Sheets

Related U.S. Application Data filed on Mar. 9, 2017, now Pat. No. 10,353,911, and a continuation-in-part of application No. 15/926,999, filed on Mar. 20, 2018, now Pat. No. 11,016,931, and a continuation-in-part of application No. 15/927,004, filed on Mar. 20, 2018, now Pat. No. 11,036,716, and a continuation-in-part of application No. 15/439,908, filed on Feb. 22, 2017, now Pat. No. 10,452,975, and a continuation-in-part of application No. 15/985,702, filed on May 22, 2018, now Pat. No. 11,068,475, and a continuation-in-part of application No. 15/985,704, filed on May 22, 2018, now Pat. No. 11,068,847, and a continuation-in-part of application No. 15/985,705, filed on May 22, 2018, now Pat. No. 11,086,896, application No. 17/332,354, which is a continuation of application No. 16/036,836, filed on Jul. 16, 2018, now Pat. No. 11,042,556, which is a continuation-in-part of application No. 15/186,514, filed on Jun. 19, 2016, now Pat. No. 10,102,258, and a continuation-in-part of application No. 15/186,516, filed on Jun. 19, 2016, now Pat. No. 10,452,677, and a continuation-in-part of application No. 15/454,923, filed on Mar. 9, 2017, now Pat. No. 10,353,911, and a continuation-in-part of application No. 15/926,999, filed on Mar. 20, 2018, now Pat. No. 11,016,931, and a continuation-in-part of application No. 15/927,004, filed on Mar. 20, 2018, now Pat. No. 11,036,716, and a continuation-in-part of application No. 15/439,908, filed on Feb. 22, 2017, now Pat. No. 10,452,975, and a continuation-in-part of application No. 15/985,702, filed on May 22, 2018, now Pat. No. 11,068,475, and a continuation-in-part of application No. 15/985,704, filed on May 22, 2018, now Pat. No. 11,068,847, and a continuation-in-part of application No. 15/985,705, filed on May 22, 2018, now Pat. No. 11,086,896.

(56) References Cited

U.S. PATENT DOCUMENTS

| | | | | |
|---|---|---|---|---|
| 11,294,972 | B2* | 4/2022 | George | H04L 67/535 |
| 11,468,049 | B2* | 10/2022 | Griffith | G06F 16/2423 |
| 11,500,831 | B2* | 11/2022 | Griffith | G06F 16/2272 |
| 2019/0050459 | A1* | 2/2019 | Griffith | G06F 16/248 |
| 2019/0065567 | A1* | 2/2019 | Griffith | G06F 16/2282 |
| 2021/0374134 | A1* | 12/2021 | He | G06F 16/24539 |
| 2021/0397626 | A1* | 12/2021 | Griffith | G06F 16/2471 |
| 2022/0229847 | A1* | 7/2022 | Jacob | G06N 5/022 |
| 2022/0277004 | A1* | 9/2022 | Griffith | G06F 16/215 |

* cited by examiner

EXTENDED COMPUTERIZED QUERY LANGUAGE SYNTAX FOR ANALYZING MULTIPLE TABULAR DATA ARRANGEMENTS IN DATA-DRIVEN COLLABORATIVE PROJECTS

CROSS-REFERENCE TO APPLICATIONS

This application is a continuation application of copending U.S. patent application Ser. No. 16/036,834, filed Jul. 16, 2018 and titled, "EXTENDED COMPUTERIZED QUERY LANGUAGE SYNTAX FOR ANALYZING MULTIPLE TABULAR DATA ARRANGEMENTS IN DATA-DRIVEN COLLABORATIVE PROJECTS;" U.S. patent application Ser. No. 16/036,834 is a continuation-in-part application of U.S. patent application Ser. No. 15/186,514, filed on Jun. 19, 2016, now U.S. Pat. No. 10,102,258 and titled "COLLABORATIVE DATASET CONSOLIDATION VIA DISTRIBUTED COMPUTER NETWORKS;" U.S. patent application Ser. No. 16/036,834 is also a continuation-in-part application of U.S. patent application Ser. No. 15/186,516, filed on Jun. 19, 2016, now U.S. Pat. No. 10,452,677 and titled "DATASET ANALYSIS AND DATASET ATTRIBUTE INFERENCING TO FORM COLLABORATIVE DATASETS;" U.S. patent application Ser. No. 16/036,834 is also a continuation-in-part application of U.S. patent application Ser. No. 15/454,923, filed on Mar. 9, 2017, now U.S. Pat. No. 10,353,911 and titled "COMPUTERIZED TOOLS TO DISCOVER, FORM, AND ANALYZE DATASET INTERRELATIONS AMONG A SYSTEM OF NETWORKED COLLABORATIVE DATASETS;" U.S. patent application Ser. No. 16/036,834 is also a continuation-in-part application of U.S. patent application Ser. No. 15/926,999, filed on Mar. 20, 2018, now U.S. Pat. No. 11,016,931 and titled "DATA INGESTION TO GENERATE LAYERED DATASET INTERRELATIONS TO FORM A SYSTEM OF NETWORKED COLLABORATIVE DATASETS;" U.S. patent application Ser. No. 16/036,834 is also a continuation-in-part application of U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS;" U.S. patent application Ser. No. 16/036,834 is also a continuation-in-part application of U.S. patent application Ser. No. 15/439,908, filed on Feb. 22, 2017, now U.S. Pat. No. 10,452,975 and titled "PLATFORM MANAGEMENT OF INTEGRATED ACCESS OF PUBLIC AND PRIVATELY-ACCESSIBLE DATASETS UTILIZING FEDERATED QUERY GENERATION AND QUERY SCHEMA REWRITING OPTIMIZATION;" U.S. patent application Ser. No. 16/036,834 is also a continuation-in-part application of U.S. patent application Ser. No. 15/985,702, filed on May 22, 2018, and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS;" U.S. patent application Ser. No. 16/036,834 is also a continuation-in-part application of U.S. patent application Ser. No. 15/985,704, filed on May 22, 2018, and titled "COMPUTERIZED TOOLS TO FACILITATE DATA PROJECT DEVELOPMENT VIA DATA ACCESS LAYERING LOGIC IN A NETWORKED COMPUTING PLATFORM INCLUDING COLLABORATIVE DATASETS;" U.S. patent application Ser. No. 16/036,834 is also a continuation-in-part application of U.S. patent application Ser. No. 15/985,705, filed on May 22, 2018, and titled "DYNAMIC COMPOSITE DATA DICTIONARY TO FACILITATE DATA OPERATIONS VIA COMPUTERIZED TOOLS CONFIGURED TO ACCESS COLLABORATIVE DATASETS IN A NETWORKED COMPUTING PLATFORM;" This application is also a continuation of copending U.S. patent application Ser. No. 16/036,836, filed Jul. 16, 2018 and titled, "LOCALIZED LINK FORMATION TO PERFORM IMPLICITLY FEDERATED QUERIES USING EXTENDED COMPUTERIZED QUERY LANGUAGE SYNTAX;" U.S. patent application Ser. No. 16/036,836 is a continuation-in-part application of U.S. patent application Ser. No. 15/186,514, filed on Jun. 19, 2016, now U.S. Pat. No. 10,102,258 and titled "COLLABORATIVE DATASET CONSOLIDATION VIA DISTRIBUTED COMPUTER NETWORKS;" U.S. patent application Ser. No. 16/036,836 is also a continuation-in-part application of U.S. patent application Ser. No. 15/186,516, filed on Jun. 19, 2016, now U.S. Pat. No. 10,452,677 and titled "DATASET ANALYSIS AND DATASET ATTRIBUTE INFERENCING TO FORM COLLABORATIVE DATASETS;" U.S. patent application Ser. No. 16/036,836 is also a continuation-in-part application of U.S. patent application Ser. No. 15/454,923, filed on Mar. 9, 2017, now U.S. Pat. No. 10,353,911 and titled "COMPUTERIZED TOOLS TO DISCOVER, FORM, AND ANALYZE DATASET INTERRELATIONS AMONG A SYSTEM OF NETWORKED COLLABORATIVE DATASETS;" U.S. patent application Ser. No. 16/036,836 is also a continuation-in-part application of U.S. patent application Ser. No. 15/926,999, filed on Mar. 20, 2018, now U.S. Pat. No. 11,016,931 and titled "DATA INGESTION TO GENERATE LAYERED DATASET INTERRELATIONS TO FORM A SYSTEM OF NETWORKED COLLABORATIVE DATASETS;" U.S. patent application Ser. No. 16/036,836 is also a continuation-in-part application of U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS;" U.S. patent application Ser. No. 16/036,836 is also a continuation-in-part application of U.S. patent application Ser. No. 15/439,908, filed on Feb. 22, 2017, now U.S. Pat. No. 10,452,975 and titled "PLATFORM MANAGEMENT OF INTEGRATED ACCESS OF PUBLIC AND PRIVATELY-ACCESSIBLE DATASETS UTILIZING FEDERATED QUERY GENERATION AND QUERY SCHEMA REWRITING OPTIMIZATION;" U.S. patent application Ser. No. 16/036,836 is also a continuation-in-part application of U.S. patent application Ser. No. 15/985,702, filed on May 22, 2018, and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS;" U.S. patent application Ser. No. 16/036,836 is also a continuation-in-part application of U.S. patent application Ser. No. 15/985,704, filed on May 22, 2018, and titled "COMPUTERIZED TOOLS TO FACILITATE DATA PROJECT DEVELOPMENT VIA DATA ACCESS LAYERING LOGIC IN A NETWORKED COMPUTING PLATFORM INCLUDING COLLABORATIVE DATASETS;" U.S. patent application Ser. No. 16/036,836 is also a continuation-in-part application of U.S. patent application Ser. No. 15/985,705, filed on May 22, 2018, and titled "DYNAMIC COMPOSITE DATA DICTIONARY TO FACILITATE DATA OPERATIONS VIA COMPUTERIZED TOOLS CONFIGURED TO ACCESS COLLABORATIVE DATA- SETS IN A NETWORKED COMPUTING PLATFORM;" all of which are herein incorporated by reference in their entirety for all purposes.

FIELD

Various embodiments relate generally to data science and data analysis, computer software and systems, and wired and wireless network communications to interface among repositories of disparate datasets and computing machine-based entities configured to access datasets, and, more specifically, to a computing and data storage platform configured to provide one or more computerized tools that facilitate development and management of data projects, including implementation of enhanced computerized query language syntax to analyze, for example, multiple tabular data arrangements in data-driven collaborative projects.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide an ability to store an increasing amount of generated data. Consequently, traditional data storage and computing technologies have given rise to a phenomenon in which numerous desperate datasets have reached sizes and complexities that tradition data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Known data-distributing technologies are not well-suited to enable interoperability among datasets. Thus, many typical datasets are warehoused in conventional data stores, which are known as "data silos." These data silos have inherent barriers that insulate and isolate datasets. Further, conventional data systems and dataset accessing techniques are generally incompatible or inadequate to facilitate data interoperability among the data silos.

Various, ad hoc and non-standard approaches have been adopted, but each standard approach is driven by different data practitioners who favor different processes. Thus, the various ad hoc approaches further exacerbate drawbacks in generating and managing datasets to review, consume, and re-use collected data, among other things. Conventionally, for example, data practitioners typically populate data into one table or sheet in a group of multiple tables during a period of time, for which spreadsheet applications, such as MICROSOFT® Excel Spreadsheet program, may be used. Each spreadsheet application may generate multiple tables as different sheets associated with a file name, whereby sheets of a spreadsheet-generated file may be otherwise viewed as a single conceptual table based on multiple tables. Traditionally, data practitioners set up data for tables in a single table in a database.

Conventional query languages implement relational-based query languages to access multiple tables separately. In some relational-based query languages, such as SQL, query commands (e.g., a UNION command) require identification of each data file from which a table may be queried. Queries are each executed against individual tables before the results may be joined into one table using the UNION command. Thus, if hundreds of tables (or data files) are to be queried using known query languages and syntaxes, then a typical query to extract data from hundreds of tables can grow disproportionally large during formation of a query. As an example, a conventional query of hundreds of spreadsheet data files or sheets of spreadsheet data files implementing a conventional relational-based query, such as implementing UNION may cause formation of a query that may be extremely large and cumbersome, and may be too unwieldly for use by each and every data practitioner. Traditionally, a data practitioner may be required to perform large numbers of "cut-and-paste" operations to form numerous lines of query commands to query large numbers of separate tables, such as different census tables for each state or information based on different cities over the world. Further, each UNION clause may invoke a corresponding query, whereby large numbers of UNION clauses (e.g., hundreds or more) causes performance of large numbers of queries on each table, thereby impacting computational resources.

In other examples, conventional approaches to querying multiple data sources at a point of time may require that a user manipulate data to form or otherwise identify a set of data prior to performing a query. For example, known querying techniques usually require identification and formation of a set of data prior to creating a query. In one instance, Athena™ query service maintained by Amazon, Inc. of Seattle, Wash., U.S.A. requires creation of data stored in Amazon S3 prior to performing a query.

Thus, what is needed is a solution for facilitating techniques to optimize data operations applied to datasets, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
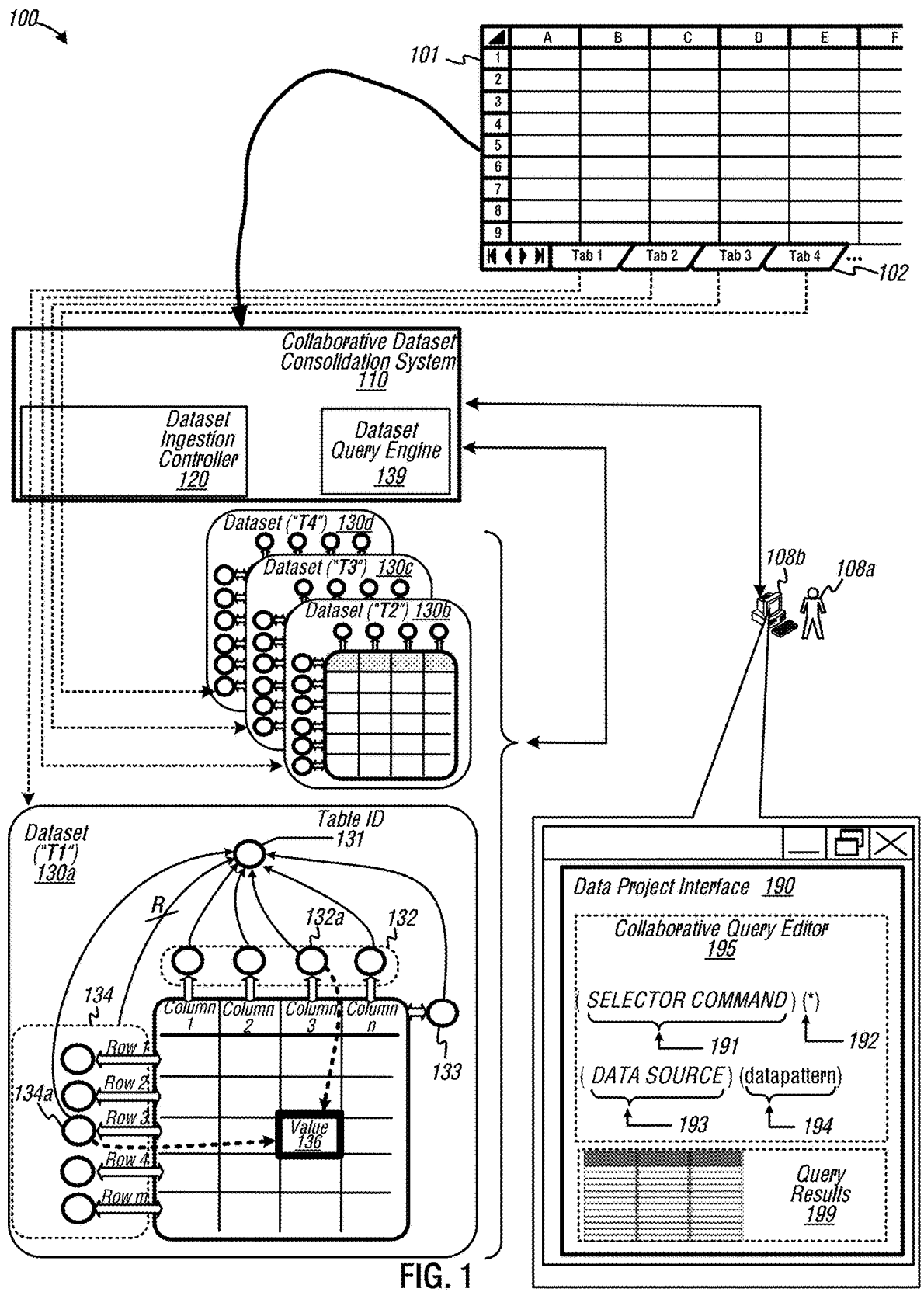
FIG. 1 is a diagram depicting an example of a collaborative dataset consolidation system configured to access multiple tabular data arrangements, according to some embodiments.

FIG. 1 is a diagram depicting an example of a collaborative dataset consolidation system configured to access multiple tabular data arrangements, according to some embodiments. Diagram 100 depicts multiple tabular data arrangements ingested into a collaborative dataset consolidation system 110, wherein multiple tabular data arrangements 101 include multiple datasets identified by tabular identifiers (e.g., tabs) 102. In the example shown, multiple datasets may be ingested into collaborative dataset consolidation system 110 contemporaneous (or nearly contemporaneous) with other datasets, each associated with tab 102. In various examples, tab identifiers 102 each may reference a subset of data associated with a period of time or transactional characteristic. Tabular data arrangements 101 may be viewed is a unitary conceptual table split into different files or sheets, such as based on durations of time. For example, tab 1 identifier, tab 2 identifier, tab 3 identifier, and tab 4 identifier may be identified with "Sales_January," "Sales_February," "Sales_March," and "Sales_April," respectively, whereby data for each file (i.e., sheet) may be compartmentalized or subdivided temporally. For example, a business may generate a new "sheet" in a spreadsheet data file or a new file (e.g., .csv file) to store monthly invoice data. Each sheet may include at least a subset of columns or data classifications in each sheet.

Diagram 100 further depicts collaborative dataset consolidation system 110 including a dataset ingestion controller 120 and a dataset query engine 139. According to some examples, collaborative dataset consolidation system 110 and/or any of its constituent components may implement a software platform composed of multiple programs or scripts (e.g., Java®, JavaScript®, JSON™, Ruby, C+, C++, C#, C, or any other structured or unstructured programming language, structured or unstructured, or the like, including, but not limited to, SQL, SPARQL, TURTLE, etc.) that is configured to parse and analyze "multi-table" data file 101 as multiple datasets to perform a query.

Dataset ingestion controller 120 may be configured to transform a tabular data arrangement in which a dataset may be introduced into collaborative dataset consolidation system 110 as another data arrangement (e.g., a graph data arrangement) in a second format (e.g., a graph). Dataset ingestion controller 120 also may be configured to perform other functionalities with which to form, modify, query and share collaborative datasets according to various examples. In at least some examples, dataset ingestion controller 120 and/or other components of collaborative dataset consolidation system 110 may be configured to implement linked data as one or more canonical datasets with which to modify, query, analyze, visualize, and the like.

Dataset ingestion controller 120 may be configured to identify and/or extract multiple datasets, such as a dataset ("T1") 130a, dataset ("T2") 130b, dataset ("T3") 130c, dataset ("T4") 130d, among others, to form graph data arrangements. For example, dataset ingestion controller 120 may form associations via nodes and links (e.g., semantically linked data) to associate each data value 136 in a cell of a tabular data arrangement may be linked to a row node 134a (of a group of row nodes 134) and a column node 132a (of a group of column nodes 132). Node 133 may identify via links to column header data that may be used to classify data (e.g., as zip codes) or identify a datatype, in accordance with some instances. As shown, data in tabular data arrangement 130a may be converted from a "spreadsheet format" into a graph data arrangement identified by data representing a table identifier ("ID") 131, whereby data values in each cell of the spreadsheet format may be linked or otherwise associated with a node in the graph data arrangement permanent.

Dataset query engine 139 may be configured to implement one or more extensions of a query language, including, but not limited to enhanced computerized query language syntax for analyzing multiple tabular data arrangements, such as a spreadsheet data file 101, as a unitary or single data table. Collaborative dataset consolidation system 110 may generate a data project interface 190 in which a collaborative query editor 195 is presented to facilitate performance of queries via dataset query engine 139. Data project interface 190 may be displayed at the computing device 108b associated with a user account for user 108a. Thus, query editor 195 may be configured to present one or more user inputs with which to form a relational-based query in an SQL-equivalent query language.

In some examples, dataset query engine 139 may implement a modified subset of executable instructions (e.g., a command of a programming language) to perform an enhanced query. In some cases, the modified executable instructions may form an extension of a relational-based query language (e.g., SQL). In some examples, queries may be optimized after being written (or rewritten) from SQL to triples using graph-based query languages, such as SPARQL™ or the like because the rewritten triple data may be stored in a data store accessed by collaborative dataset consolidation system platform 110 (e.g., data may be converted into triple data from incoming queries). In one example, an extended SQL command may be configured to invoke a graph-based query command, such as a SPARQL command, to perform a multi-table query as descried herein. Thus, a collaborative query editor 195 in data project interface 190 may be configured to receive a command in a SQL-extended or relational data syntax to access databases operational in accordance with relational data models, schemas, etc.

A multi-table query, according to some examples, may include a first query command, such as SELECTOR COMMAND 191, which may be configured to select one or more subsets of data identified by SUBSET IDENTIFIER 192. A subset of data may include data in a column of a sheet 102 of spreadsheet data file 101. In the example shown, an asterisk character, or "*," may represent a wildcard variable to include each subset of data (e.g., each column) in a query. Thus, an asterisk character may identify each subset or columns of data based on SUBSET IDENTIFIER 192. Note that the parentheticals associated with SELECTOR COMMAND 191 and SUBSET IDENTIFIER 192 are optional and need not be implemented in a first query command.

In accordance with further examples, a multi-table query may include a second query command, which may be configured to extract data associated with one or more subsets (or columns) of data. As shown, a second query command may include a DATA SOURCE 193 identifier to select one or more datasets (e.g., a subset of datasets) from which to extract the data. For example, DATA SOURCE 193 may identify one or more tables with which to access. A second query command may also include one or more data pattern 194 to identify, for example, one or more file identifiers associated with a subset of datasets to be included in the query. For example, data pattern 194 includes one or more dataset identifiers and/or file names for multiple tables. In some examples, one instance of a first and the second query command may be sufficient to perform multi-table query, according to various embodiments described herein.

Collaborative query editor 195 may also include user inputs (not shown) to apply a query (based on the first query command and the second query command) to one or more of datasets. The one or more datasets may include data ingested from multiple tabular data arrangements, which may be linked to one or more graph data arrangements. Results of the query may be presented as query results 199 in data projects interface 190. In at least one example, query results 199 may be presented in a common interface coextensive with presentation of query editor 195.

In some examples, SELECTOR COMMAND 191 may be implemented as a SQL-based query command, and may include a SELECT statement (i.e., a programmatic query command or query statement intended to fetch an intended dataset or data stored within a given database). Hence, collaborative dataset consolidation system platform 110 may be configured to convert a query statement (e.g., SELECT in SQL, and other comparable commands in any other type of query language, structured or unstructured) into graph-formatted data (or triple data). Using attributes (e.g., SUBSET IDENTIFIER 192) or other triple data, dataset query engine 139 may be configured to rewrite the query into a format, language, or structure that can be used to retrieve data from a dataset in a database, regardless of the database format, schema, structure, or language of the target database and dataset(s). Further, the triple data associated with attributes of the query may also be used to manage, navigate, address, respond to, or otherwise perform data operations relative to data at a database.

According to at least one example, a multi-table query may include a second query command as a modified or extended query command. For example, DATA SOURCE 193 may be an extended SQL command configured to identify or list multiple datasets or tables from which to extract data. To illustrate, consider that DATA SOURCE 193 may be implemented as an extended FROM clause or command, where a non-extended FROM clause or command is specified in nominal SQL query programming languages.

In view of the foregoing, one or more structures and/or one or more functionalities described in FIG. 1 (or anywhere herein) may be configured to implement a modified or extended query command (e.g., an extended SQL command and/or syntax thereof), whereby an extended query command may be configured to identify multiple sources of data (e.g., multiple tables) "in line," or during query editing (e.g., during contemporaneous presentation of a query editor 195). Thus, query editor 195 may be configured to receive query commands or instructions to access the data from multiple tabular data arrangements "in-situ" (e.g., during a process of forming or writing a query). As such, multiple tables need not be integrated to form a single table prior to generating a query in collaborative query editor 195, thereby preserving resources and computational resources before performing multi-table queries. Further, a modified or extended query command may identify multiple datasets or tables against which to query implementing a "light weight" syntax. That is, a modified or extended query command may identify multiple datasets or tables in a minimal amount of characters, which may include a data pattern that may be used to identify each table of a group of tables in a query. For example, a subset of characters, such as "sales," may be used to identify multiple tables of "Sales_January," "Sales_February," "Sales_March," and "Sales_April." An extended FROM clause or command, according to various examples described herein, may sufficiently advised identify multiple tables in a single line of code (a line in query editor 195), whereby a single line of code may include characters over multiple lines of the extended FROM clause and prior to a next clause or command (e.g., a JOIN, a WHERE, or any other clause). In at least one example, a unitary extended FROM clause or command may identify multiple tables, thereby obviating a requirement to employ multiple SQL commands (e.g., multiple UNION commands) to perform a multi-table query.

Figure 2:
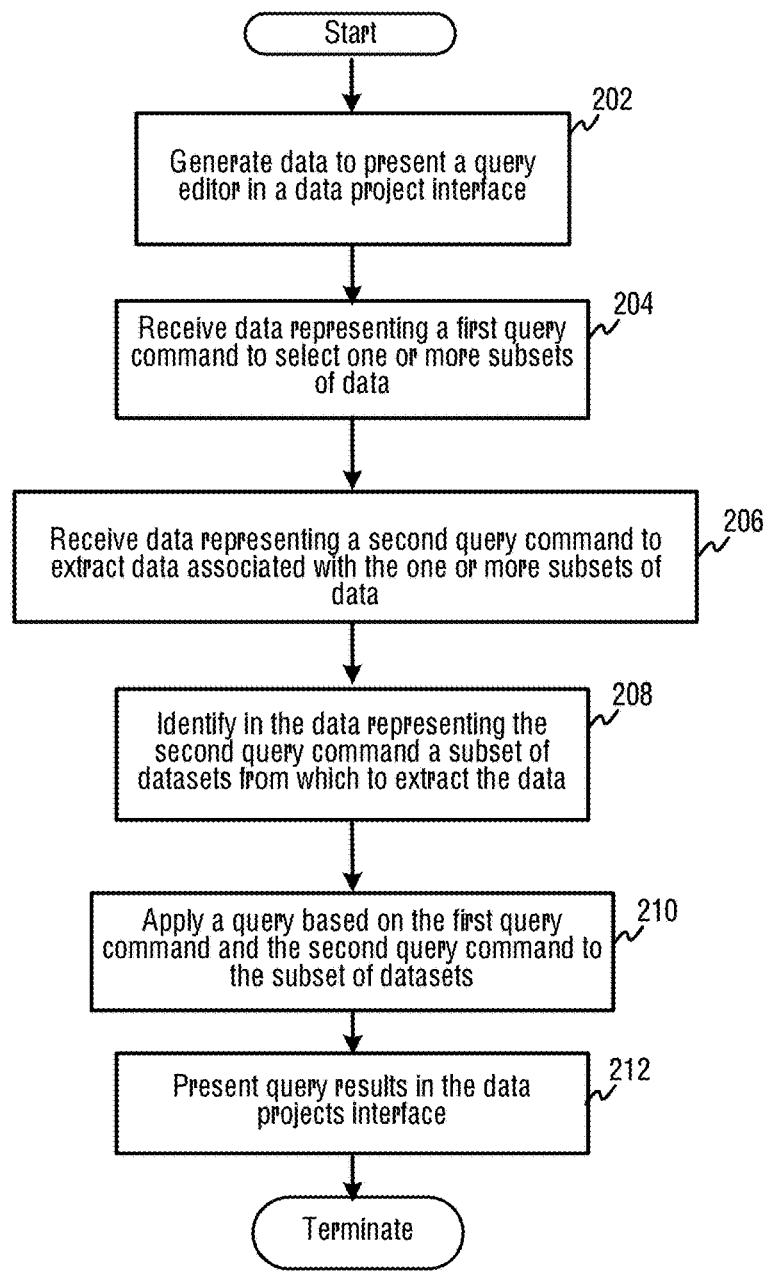
FIG. 2 is a flow diagram depicting an example of forming a query implementing an extended query command, according to some embodiments.

FIG. 2 is a flow diagram depicting an example of forming a query implementing an extended query command, according to some embodiments. In some examples, flow diagram 200 may be implemented via computerized tools including a data project interface, which may be configured to initiate and/or execute instructions to form a query in association with, for example, a collaborative dataset consolidation system. At 202, data to present a query editor in a data project interface may be generated. In some cases, generating data to present a query editor may include forming a query editor to accept commands configured to access data stored in accordance with relational data models. A query editor may be formed to accept commands via user inputs to form a relational-based query in an SQL-equivalent query language. At 204, data representing a first query command may be received to select one or more subsets of data.

At 206, data representing a second query command may be received to extract data associated with one or more subsets of data. In some examples, data representing a second query command may include data figured to determine a data source with which to query by, for example, detecting multiple dataset identifiers, each of which is associated with a different dataset. In some implementations, multiples dataset identifiers may be detected by receiving the identifiers via a single second query command, according to some examples. Data representing the second query command may include an instruction (e.g., an extended FROM clause) to access the data from multiple tabular data arrangements in-situ during query writing or formation.

At 208, other data associated with a second query command may be configured to identify a subset of datasets from which to extract query data. In some cases, the other data may include one or more data patterns that identify multiple tables from which to extract data. For example, data representing a second query command may include data identifying multiple table names in a DATA SOURCE instruction (e.g., an extended FROM clause). At 210, a query may be applied against under one or more datasets (e.g., one or more graph data arrangements linked to one or more tables), whereby the query may be based on a first and a second query command. In some examples, data for each of the datasets may be retrieved from graph data arrangements, whereby the data originates from multiple tabular data arrangements, each of which may be independent data arrangements. At 212, query results may be presented in a data projects interface.

Figure 3:
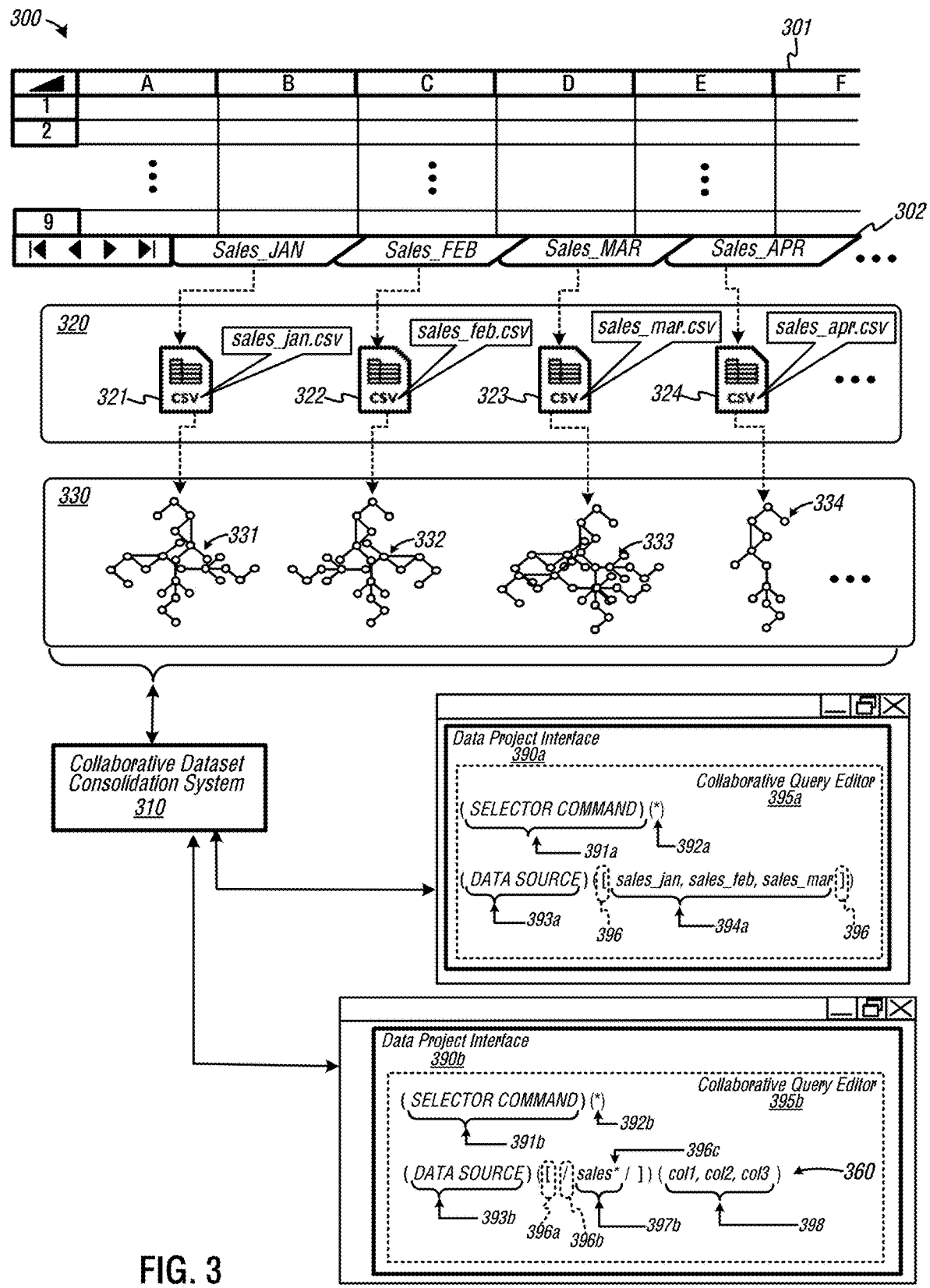
FIG. 3 is a diagram depicting further examples of collaborative query editors to form multi-table queries, according to some examples.

FIG. 3 is a diagram depicting further examples of collaborative query editors to form multi-table queries, according to some examples. Diagram 300 depicts a spreadsheet data arrangement 301 in which each tabular dataset identified by a tab icon 302, such as Sales_JAN, Sales_FEB, Sales_MAR, and Sales_APR. Each dataset may be identified as an independent and separate tabular dataset 320 associated with data file 301, such as tabular dataset ("sales_jan.csv") 321, tabular dataset ("sales_feb.csv") 322, tabular dataset ("sales_mar.csv") 323, and tabular dataset ("sales_apr.csv") 324. Collaborative dataset consolidation system 310 may be configured to convert tabular data arrangements 321 to 324 into graph data arrangements 331 to 334, respectively. Further, collaborative dataset consolidation system 310 and/or a dataset query engine may be configured to facilitate generation of data project interfaces 390a and 390b to perform a multi-table query.

Data project interfaces 390a and 390b include collaborative query editors 395a and 395b, respectively. Further, collaborative query editor 395a is shown to include SELECTOR COMMAND 391a and SUBSET IDENTIFIER 392a, and collaborative query editor 395b is shown to include SELECTOR COMMAND 391b and SUBSET IDENTIFIER 392b. Also, collaborative query editors 395a and 395b are shown to include DATA SOURCEs 393a and 393b, either of which may be an extended SQL command (e.g., an extended FROM clause or command) that may be configured to identify or list multiple datasets or tables from which to extract data. One or more elements depicted in diagram 300 of FIG. 3 may include structures and/or functions as similarly-named or similarly-numbered elements depicted in other drawings, or as otherwise described herein, in accordance with one or more examples, such as described relative to FIG. 1. Note that the parentheticals associated with SELECTOR COMMANDs 391a and 391b, and SUBSET IDENTIFIERs 392a and 392b, as well as other parentheticals depicted in FIG. 3, may be optional and need not be implemented in a query command.

As shown in collaborative query editor 395a, DATA SOURCE 393a, as a second query command, may include a data pattern 394a to specify which of multiple tables may be included in a multi-table query. In this example, inclusion of dataset identifiers sales_jan, sales_feb, and sales_mar causes a multi-table query to be performed on these datasets, but excludes dataset sales_apr as it is not explicitly listed. In this example, data pattern 394a is implemented using a multi-table syntax based on delimiters 396, such as brackets ("[" or "]"). Thus, data pattern 394a bounded by delimiters 396 may identify multiple tables in, for example, one line of a query or need not necessitate the user of another query command or clause, thereby foregoing requirement to use multiple "UNION" clauses.

In collaborative query editor 395b, DATA SOURCE 393b, as a second query command, may include another data pattern 394b to specify which of multiple tables may be included in a multi-table query. In this example, data pattern 394b is implemented using a multi-table syntax based on delimiters 396a, such as brackets ("[" or "]"). In the example, shown, a portion of multiple file identifiers including a data pattern 397b associated with each of the datasets may be queried based on a subset of a string, such as "sales." Optionally, a second delimiter 396b, such as a forward slash character ("/"), or any other non-conflicting character, may be used as part of another multi-table syntax to query multiple tables. In some cases, one or more variable characters 396c, such as an asterisk ("*"), may be used as variables for varying portions of multiple file identifiers. Hence, an asterisk or other variables may be equivalent to a standard Java regular expression ("regex") to form pattern-matching of identifiers or filenames. So in this example, data pattern 397b including a string of "sales" may identify multiple dataset identifiers sales_jan, sales_feb, sales_mar, and sales_apr., against which to perform a multi-table query. Thus, in this example, wildcard variable 396c may be used to forego requiring matching of filename portions that include "_jan," "_feb," "_mar," and "_apr."

In yet another example, collaborative query editor 395b may be configured to receive data 398 representing one or more explicit selections to target subsets of data in the subset of datasets. Explicit selections to target specified columns of data may be indicated for targeting by listing columns of interest, such as, for example, "col1," "col2," and "col3," which may be another data pattern 398 (and may be optional). Thus, while columns may be added in other subsequent tabular datasets (or tabs of a spreadsheet data file for later date ranges), certain columns may be queried over multiple tables or datasets in, for example, a second query command that includes one or more data patterns 397b and 398 in association with a unitary query command in line 360. According to some examples, targeted columns may be specified in an extended FROM clause in a second query command rather than a SELECT clause in a first query command.

Figure 4A:
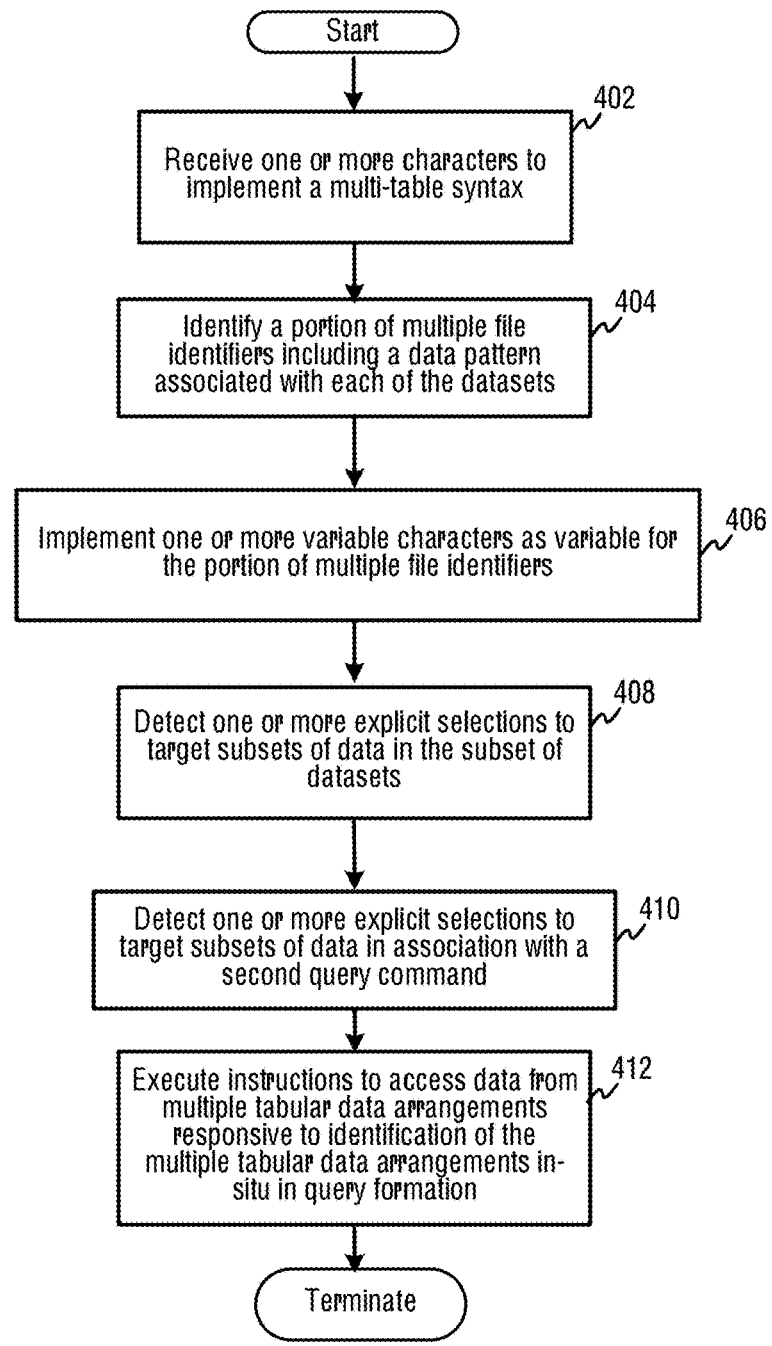
FIG. 4A is a flow diagram depicting an example of forming a query implementing an extended query command and additional data patterns, according to some embodiments.

FIG. 4A is a flow diagram depicting an example of forming a query implementing an extended query command and additional data patterns, according to some embodiments. In some examples, flow diagram 400 may be implemented via computerized tools including a data project interface, as described herein. At 402, data to represent one or more characters, such as a string of characters, may be received to implement a multi-table syntax for an extended FROM clause configured to apply SPARQL queries to one or more graph data arrangements, at least in some examples. The one or more characters may constitute an extended query command or clause, or may represent one or more data patterns with which to extract data from multiple datasets.

At 404, a portion of multiple file identifiers may be identified as a data pattern associated with each dataset to be queried (e.g., a portion including a "sales" string portion). At 406, data representing one or more variable characters may be implemented as a variable (e.g., a wildcard variable) to disregard non-matching characters or uncommon data patterns. At 408, data representing one or more explicit selections may be detected optionally. An explicit selection may include a data pattern specifying specific targeted subsets of data in association with a second query command at 410 rather than, for example, a first query command. At 412, data representing instructions to access data via a query at multiple tabular data arrangements may be executed or otherwise performed. In some examples, the query may be performed responsive to identifying multiple tabular data arrangements in-situ at a point in time at which a query is written or formed. For example, mappings between the data values in an ingested tabular data arrangement and a graph data arrangement may be linked or otherwise mapped with each other, whereby datasets may be identified as blocks of data. Thereafter, a graph-based query may be applied to the blocks of data (e.g., rewriting a relational-based query as to include a graph-based query, such as in a SPARQL-equivalent query language).

Figure 4B:
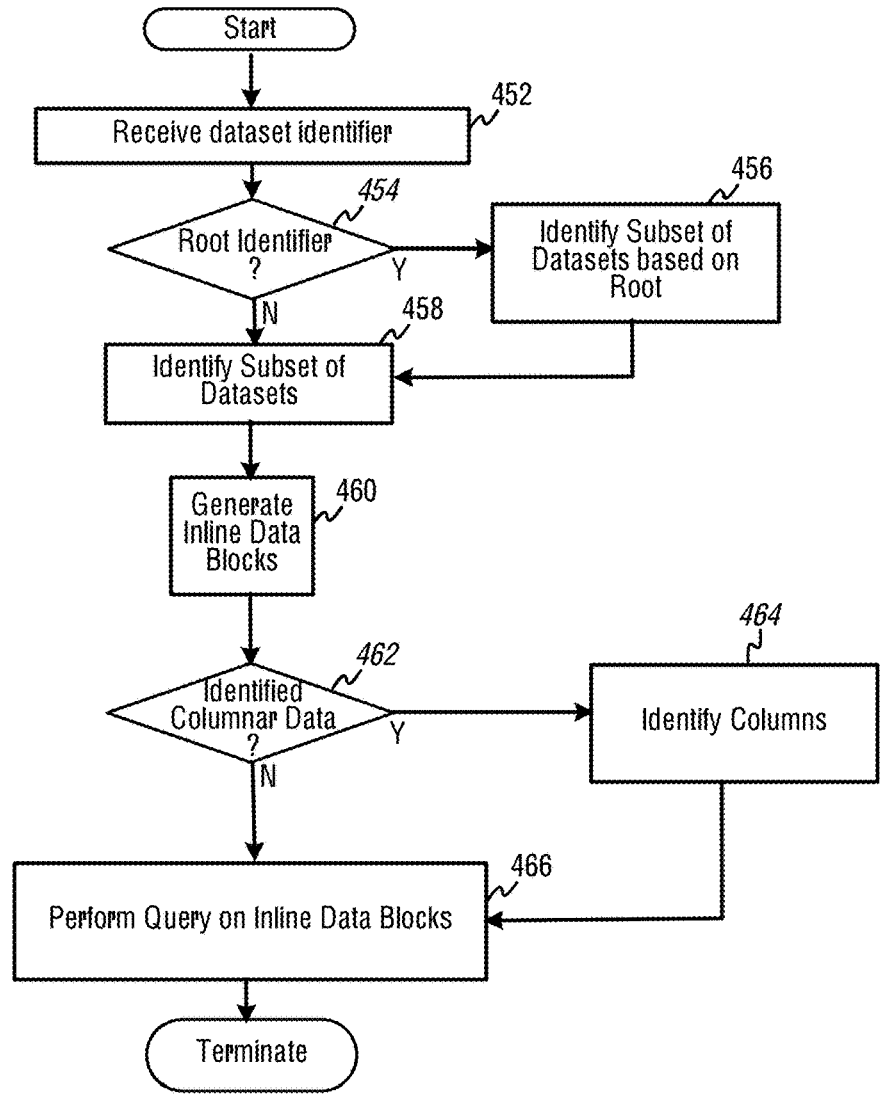
FIG. 4B is a flow diagram depicting a specific example of forming a query implementing an extended query command, according to at least some embodiments.

FIG. 4B is a flow diagram depicting a specific example of forming a query implementing an extended query command, according to at least some embodiments. At 452, a query may be received to include a reference to a dataset identifier. In some examples, a dataset identifier may include a file name or any other reference to a set of data (e.g., a sheet name or number of a spreadsheet file). At 454, a determination is made to determine whether a portion of a dataset identifier (e.g., a root portion) may be matched with other file names or data subsets (e.g., columns or column headings) therein. In one example, one or more variable characters, such as an asterisk ("*") as 396c of FIG. 3, may be used as variables for varying portions of multiple file identifiers. If a root identifier is available at 454, flow 450 moves to 456 at which a subset of datasets may be identified based on a root or portion of a file name, as an example. In not, flow 450 passes to 458 at which a subset of datasets may be identified for query. At 460, inline data blocks may be generated during the query. In some examples, inline "tabular datasets" (e.g., tables) may be instantiated during the query of a graph, whereby tabular data arrangements may be joined to facilitate a query across multiple tables. In at least one example, a VALUES clause or keyword, based on SPARQL protocol and language may be implemented to form inline tables linked to portions of a graph to form a multiple table set of data that may be queried based on one or more transformed SQL commands. In some examples, a determination may be made as to whether columnar data are identified at 462 as being part of a query. If columnar data is identifier, flow 450 moves to 464 at which selected subsets of data may be extracted or otherwise identified for a query. For example, one or more explicit selections of certain subsets of data may be extracted from the identified datasets (e.g., "col1," "col2," and "col3" as another data pattern 398 of FIG. 3). Otherwise, flow 450 moves to 466 at which the query may be performed on the inline data blocks constituting multiple tables of data, whereby the data are linked to one or more portions of a graph.

Figure 5:
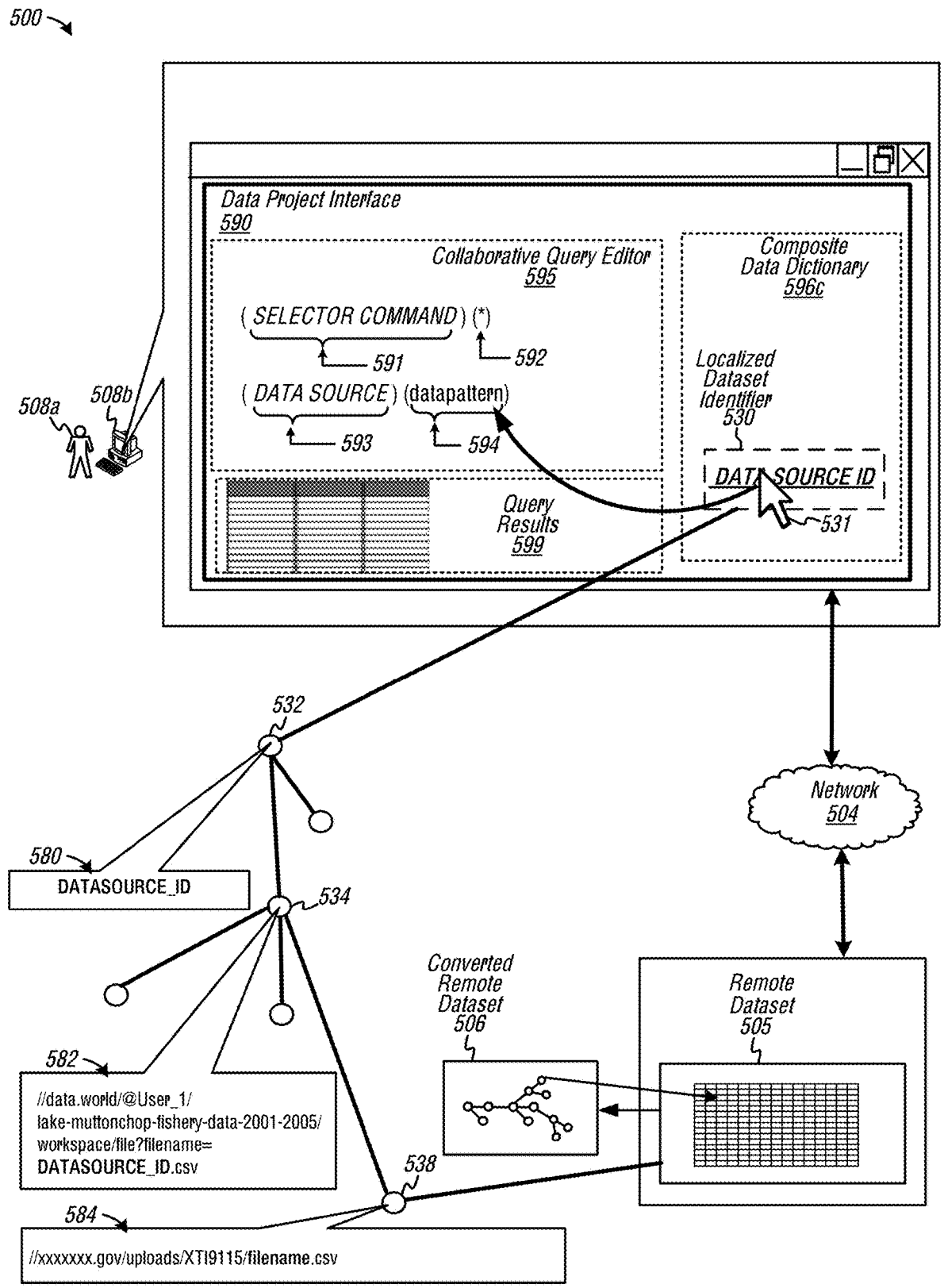
FIG. 5 is a diagram depicting a collaborative query editor configured to query an external dataset is a localized dataset, according to some examples.

FIG. 5 is a diagram depicting a collaborative query editor configured to query an external dataset is a localized dataset, according to some examples. Diagram 500 depicts a data project interface 590 being generated for display via a computing device 508b to a user 508a, data project interface 590 including a collaborative query editor 595 to form queries, a composite data dictionary 596c, and a query results interface portion 599 to present query results coextensively with presentation of collaborative query editor 595, at least in some implementations.

Collaborative query editor 595 is shown to include SELECTOR COMMAND 591 and SUBSET IDENTIFIER 592 as constituent components of a first query command, and DATA SOURCE 593 and data pattern 594 as constituent components of a second query command. DATA SOURCE 593 may be an extended SQL command (e.g., an extended FROM clause or command) that may be configured to identify multiple datasets or tables from which to extract data. One or more elements depicted in diagram 500 of FIG. 5 may include structures and/or functions as similarly-named or similarly-numbered elements depicted in other drawings, or as otherwise described herein, in accordance with one or more examples. Note that the parentheticals associated with SELECTOR COMMAND 591 and SUBSET IDENTIFIER 592, as well as other parentheticals depicted in FIG. 5, may be optional and need not be implemented in a query command.

Composite data dictionary 596c may include data descriptors, or identifiers, to describe data in each subset of data of dataset associated with a data project, regardless of whether the data resides locally or external to a collaborative dataset consolidation system. In some examples, data descriptors or subset identifiers may be derived from a column annotation or heading. Composite data dictionary 596c may include references to datasets (e.g., each table or graph), and, as such, interactive composite data dictionary 596c may be used to form a query by "copying" or "dragging and dropping" a reference via cursor 531 (or any other user input) to a dataset identifier, such as a file name, into collaborative query editor 595c.

In the example shown, data pattern 594 may be included into a query as a localized dataset identify 530, which may be a localized reference (e.g., within a local namespace) of the remote dataset 505 that may include data queryable via network 504. In some examples, a localized dataset identifier 530 may reference a dataset identifier for a spreadsheet data file (e.g., a remote spreadsheet data file), and/or any tab or sheet that may include data that may be extracted from the spreadsheet data file. As shown, remote dataset 505 may be converted into a graph data arrangement, such as converted remote dataset 506. In some examples, data values of remote dataset 505 may be stored remotely (e.g., the data values of remote dataset 505 need not be downloaded into a local system), whereby converted remote dataset 506 may include links and nodes (e.g., consistent with RDF, triples formatted data, etc.) that reference the remotely-disposed data values. For example, remote dataset 506 may include a node 538 that is linked to, or is otherwise associated with, data representing a remote or fully qualified path to access remote dataset 505. An example of a remote or fully qualified path may include a URL 584 in a global namespace. Remote dataset 506 may also include a node 534 that is linked to, or is otherwise associated with, data representing a local path in a local domain to access URL 584. Here, node 534 may reference a URL 582 in a local namespace. Further, node 532 may be linked to, or otherwise associated with, data representing a local DATA-SOURCE_ID 580, which may be a localized file name. Therefore, in view of the foregoing, a query may be written or created within collaborative query editor 595 to access a remote dataset that may be referenced as a localized dataset by a localized dataset identifier 530. Also, an extended FROM clause or command may reference at remote dataset using localized references.

Figure 6:
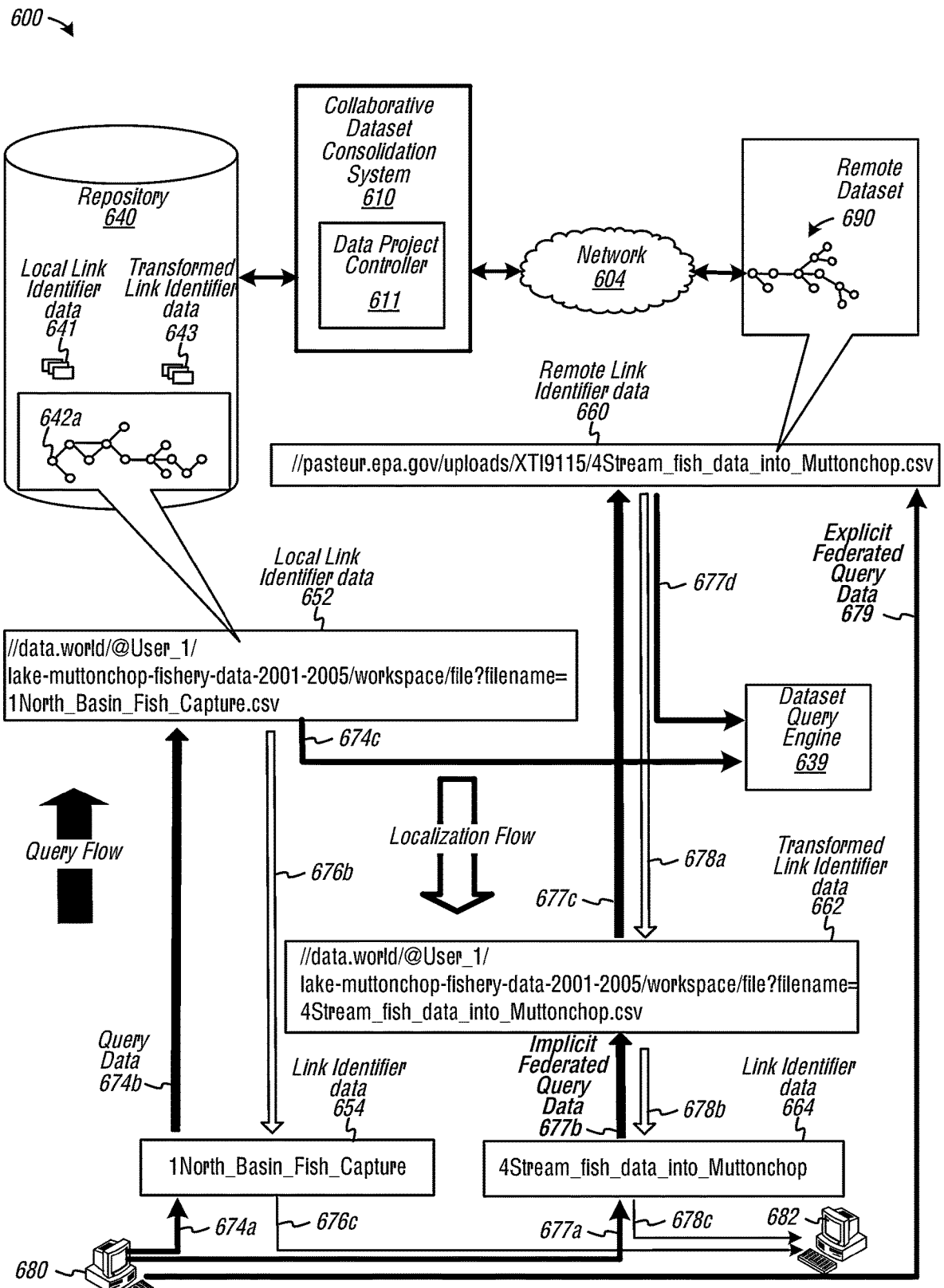
FIG. 6 is a block diagram depicting an example of localization dataset file identifiers to facilitate query formation and presentation via user interfaces, according to some examples.

FIG. 6 is a block diagram depicting an example of localization dataset file identifiers to facilitate query formation and presentation via user interfaces, according to some examples. Diagram 600 includes a collaborative dataset consolidation system 610 including a data project controller 611, either of which may be coupled to a repository 640 to access a local dataset 642*a* or a remote dataset 690 via network 604. Collaborative dataset consolidation system 610 and/or data project controller 611 are configured to localize dataset file identifiers to form dataset identifiers in a local namespace. Note that a data project interface (not shown) may include a workspace interface portion ("workspace") that may provide a unified view to facilitate data inspection, dataset importation, querying, and reviewing query results within an interface. Examples of a data project controller 611, data projects, a workspace, and other elements depicted in FIG. 6 are described in U.S. patent application Ser. No. 15/985,702, filed on MM/DD/YY, titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," which is herein incorporated by reference.

For example, collaborative dataset consolidation system 610 may be configured to localize, for example, remote link identifier data 660 that may link a remote and external dataset into a data project. An example of remote link identifier data 660 includes a URL directed to an external data source in a global namespace. According to some examples, collaborative dataset consolidation system 610 may transform remote link identifier data 660 into a localized adaptation via path 678*a* to form a transformed link identifier 662, which may be a transformed dataset file identifier in a local namespace. Link identifier data 664 may be formed via path 678*b* based on transformed link identifier data 662. Further, link identifier data 664 may be formed as an associated dataset identifier (e.g., localized file name) that may be presented via path 678*c* for display as a user input in a user interface portion at a computer device 682. In some examples, data representing a relationship among link identifier data 664, transformed link identifier data 662, and remote link identifier data 660 may be stored as transformed link identifier data 643 in repository 640. Thus, transformed link identifier data 643 may be used to generate implicitly federated queries by using localized link identifier data 664 to access remote dataset 690 implicitly in a federated query. For example, a query generated in SPARQL may be configured to be automatically performed, without user intervention, as a service graph call to a remote graph data arrangement in a remote dataset. In some examples, transformed link identifier data 662 may not be available to form a query. As such, an explicit federated query via path 679 may implement a path identifier in a global namespace to access a remote dataset rather than using a localized version.

Similarly, collaborative dataset consolidation system 610 may import or upload data for a dataset 642*a* for local storage in repository 640, whereby a dataset file name may be stored in association with a local namespace. For example, local link identifier data 652 may include a dataset file identifier in a local namespace. Link identifier data 654 may be formed via path 676*b* based on local link identifier data 652. Further, link identifier data 654 may be formed as an associated dataset identifier that may be presented via path 676*c* for display as a user input in a user interface portion at computer device 682. In some examples, data representing a relationship between link identifier data 654 and local link identifier data 652 may be stored as local link identifier data 641 in repository 640. Thus, local link identifier data 641 may be used to generate queries by using localized link identifier data 654 to access local dataset 642*a* explicitly in a query (e.g., a query generated in SPARQL). According to various examples, link identifier data 654 and 664 may be implemented as selectable (e.g., hyperlinked) user inputs disposed in a data source links interface portion, a composite data dictionary interface portion, and the like. In some examples, a query including local data may be in a form of an explicit federated query.

To illustrate utilization of link identifier data 654 and 664 in query formation, consider that a collaborative query editor in a data project interface is presented at a computer device 680 for forming a query against dataset 642*a* and remote data set 690. A collaborative query editor may include a reference to dataset 642*a* by entering via path 674*a* link identifier data 654 from a composite data dictionary, which is not shown (e.g., via a drag and drop user input operation). A query including link identifier data 654 may reference local link identifier data 652 as query data via path 674*b*. Local link identifier data 641 may provide interrelationship data between data 654 in data 652. Further, local link identifier data 652 may be applied via path 674*c* to a dataset query engine 639 to facilitate performance of the query (e.g., as an explicit service graph call to a local graph data arrangement in a local data store). Next, consider that the collaborative query editor may also include another reference to remote dataset 690 by entering link identifier data 664 via path 677*a* from a composite data dictionary, which is not shown (e.g., via a drag and drop user input operation or a text entry operation). A query including link identifier data 664 may reference transformed link identifier data 662 as implicit federated query data via path 677*b*. Transformed link identifier data 643 of repository 640 may be accessed to identify remote link identifier data 660 via path 677*c* based on transformed link identifier data 662. Further, remote link identifier data 660 may be applied via path 677*d* to dataset query engine 639 to facilitate performance of the query on remote dataset 690 (e.g., as an explicit service graph call).

In view of the foregoing, link identifier data 654 and 664 enable dataset file names and locations to be viewed as if stored locally, or having data accessible locally. Further, link identifier data 654 and 664 may be implemented as "shortened" dataset file names or localized file locations. As such, users other than a creator a dataset may have access to a remote dataset 690 as a pseudo-local dataset, thereby facilitating ease-of-use when forming queries regardless of actual physical locations of datasets. Moreover, localized references may be presented in a local namespace rather than necessitating the use of an explicit use of a global namespace to form queries, including multi-table queries, or perform any other data operation in association with a data project interface, according to various embodiments.

Figure 7:
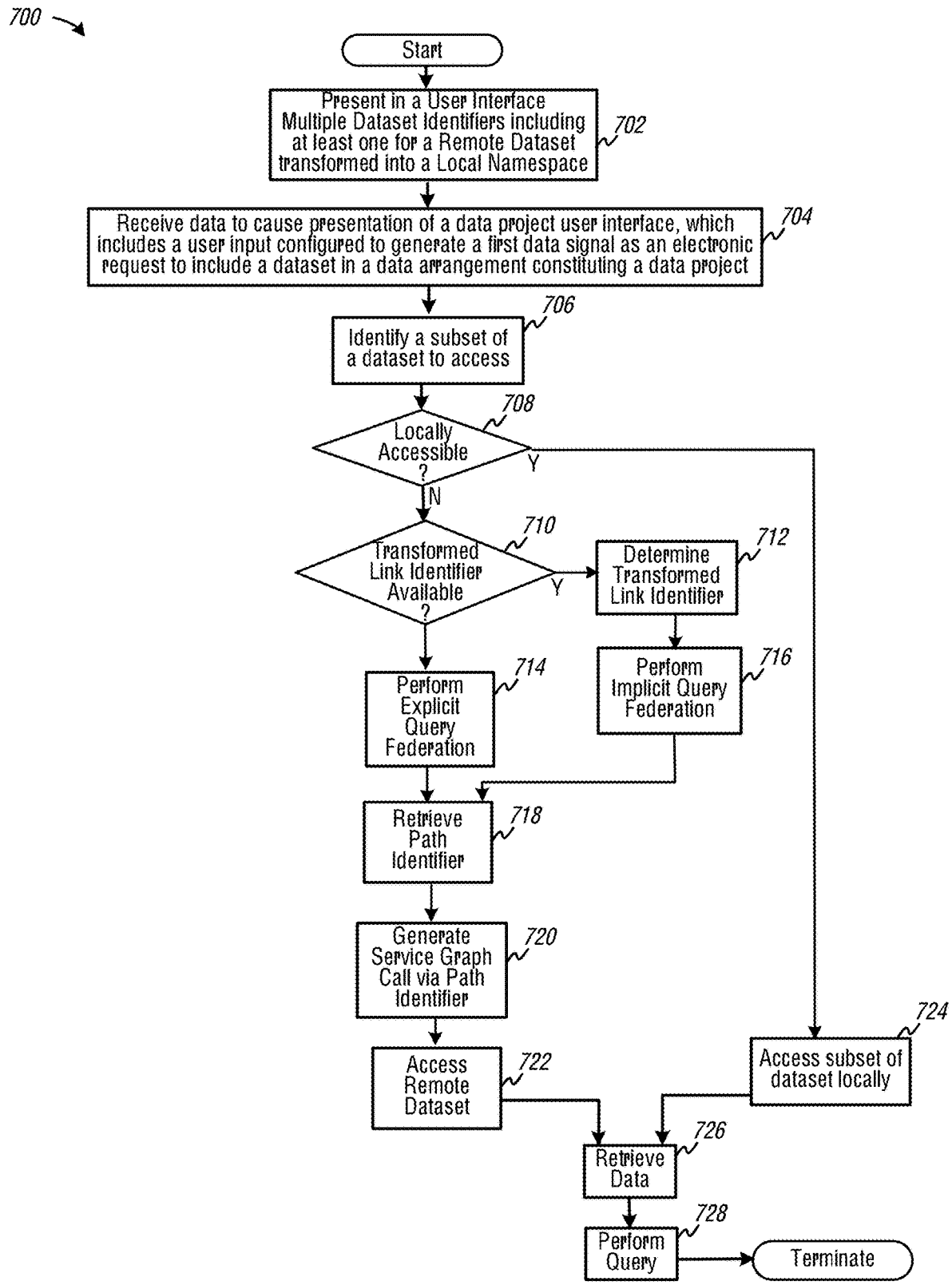
FIG. 7 is a diagram depicting implementation of a query via a localized dataset identifier, according to some examples.

FIG. 7 is a diagram depicting implementation of a query via a localized dataset identifier, according to some examples. Flow 700 begins at 702, whereby multiple dataset identifiers may be presented in a user interface, such as in a composite data dictionary, according to one example. At 704, data configured to cause presentation of a data project user interface may be received. The data presented may include a user input configured to generate a data signal as an electronic request to include a dataset in a data arrangement constituting a data project. In one example, the user input may be configured to generate a data signal to access or import data associated with a remotely-stored dataset. In some implementations, a remote dataset may be imported into a data project by, for example, associating data representing a local link identifier for the remote dataset to a data arrangement constituting a data project. Note that importing a dataset into a data project may include identifying each unit of data (each data value at, for example, a cell of a column and row), forming links to each of the units of data in the remote dataset, and storing links in an atomized dataset, whereby the data values of the remote data set may reside remotely in the not be uploaded locally.

At 706, a subset of a dataset may be identified for access. For example, a subset of the dataset may be identified for access responsive to detecting activation of the user input via the generated data signal. In another example, data representing a descriptive column heading as an identifier for a subset of the dataset (e.g., a subset including data derived from column data in a tabular data arrangement) may be selected for inclusion in a query. If the identifier relates to a remotely-stored dataset, then a query may be written to extract data from an external data source, for example, at query runtime.

At 708, a determination is made as to whether to locally access a dataset. For example, data associated with the received data signal may be analyzed to determine the dataset is stored remotely (e.g., remotely-accessible from a data project interface or collaborative dataset consolidation system via a network). If a dataset is accessible locally, then flow 700 moves to 724, at which a subset of a dataset may be accessed locally to extract data to generate a query result.

At 710, a determination is made as to whether a transformed link identifier is available when, for example, an identified dataset (or a portion thereof) may not be stored locally. In some cases, a query may be formed to federate over one or more remote endpoints (e.g., multiple remote endpoints). If a transformed link identifier is available at 710, then implicit query federation may be performed in a query. In some examples, an implicitly federated query may include using a localized dataset identifier (e.g., in a local namespace) that may reference another dataset identifier in a global namespace for an external data source.

At 712, a transformed link identifier may be determined, through which a related other dataset identifier in a global namespace may be determined for accessing a remotely-stored dataset. In some implementations, a remote link identifier associated with a remote data source at which the dataset is stored may be identified (e.g., a qualified path or a URL identifying a remote location). Then, a remote dataset identifier may be transformed to form data representing a link identifier, such as a localized dataset identifier (e.g., localized dataset identifier or filename in a local namespace). Hence, a dataset identifier in a global namespace for a remote dataset may be transformed into a local namespace (e.g., a remotely-stored dataset may be identified by a transformed link identifier data).

At 716, an implicit query federation may be created and/or performed in a query via a query editor using a transformed link identifier, whereby a localized link identifier may be presented in a data project user interface within a local namespace associated with the data project. According to some examples, an implicitly federated query may be formed by detecting activation of another user input to form a query operation. Data associated with the activation of this user input may represent a query command, such as an extended FROM clause or command to identify a remote data source from which to extract data associated with a dataset. Performing an implicit federated query may include applying a query operation, such as a multi-table query, via a transformed link identifier against a dataset and one or more other datasets. A multi-table query may be generated in query editor interface portion that includes a command or data pattern that identifies multiple tabular data arrangements in, for example, a spreadsheet data file. In at least one example, a query editor interface portion may be configured to receive detect one or more explicit selections to extract subsets of data from the dataset (e.g., "col1," "col2," and "col3" as another data pattern 398 of FIG. 3).

At 718, another dataset identifier (e.g., in a global namespace) may be retrieved as a path identifier (e.g., a URL to an external data source). In an event that a transformed link identifier may not be available at 710, an explicitly federated query may be performed at 714. In some examples, an explicitly federated query may include a dataset identifier in a global namespace (e.g., non-local), whereby the non-localized dataset identifier may be retrieved as a path identifier, or URL (or IRI), at 718.

At 730, a service graph call may be generated to access a remotely-store data source via a path identifier. In some examples, service graph call may be initiated in a graph-related query language command. An example of such a command may be written in SPARQL, or a variant thereof, and needs no manual intervention to initiate. At 722, a remote dataset may be accessed to, for example, extract the data. At 726, data may be retrieved from the remotely-stored dataset, and an implicitly federated query may be executed or performed upon the retrieved data at 728.

Figure 8:
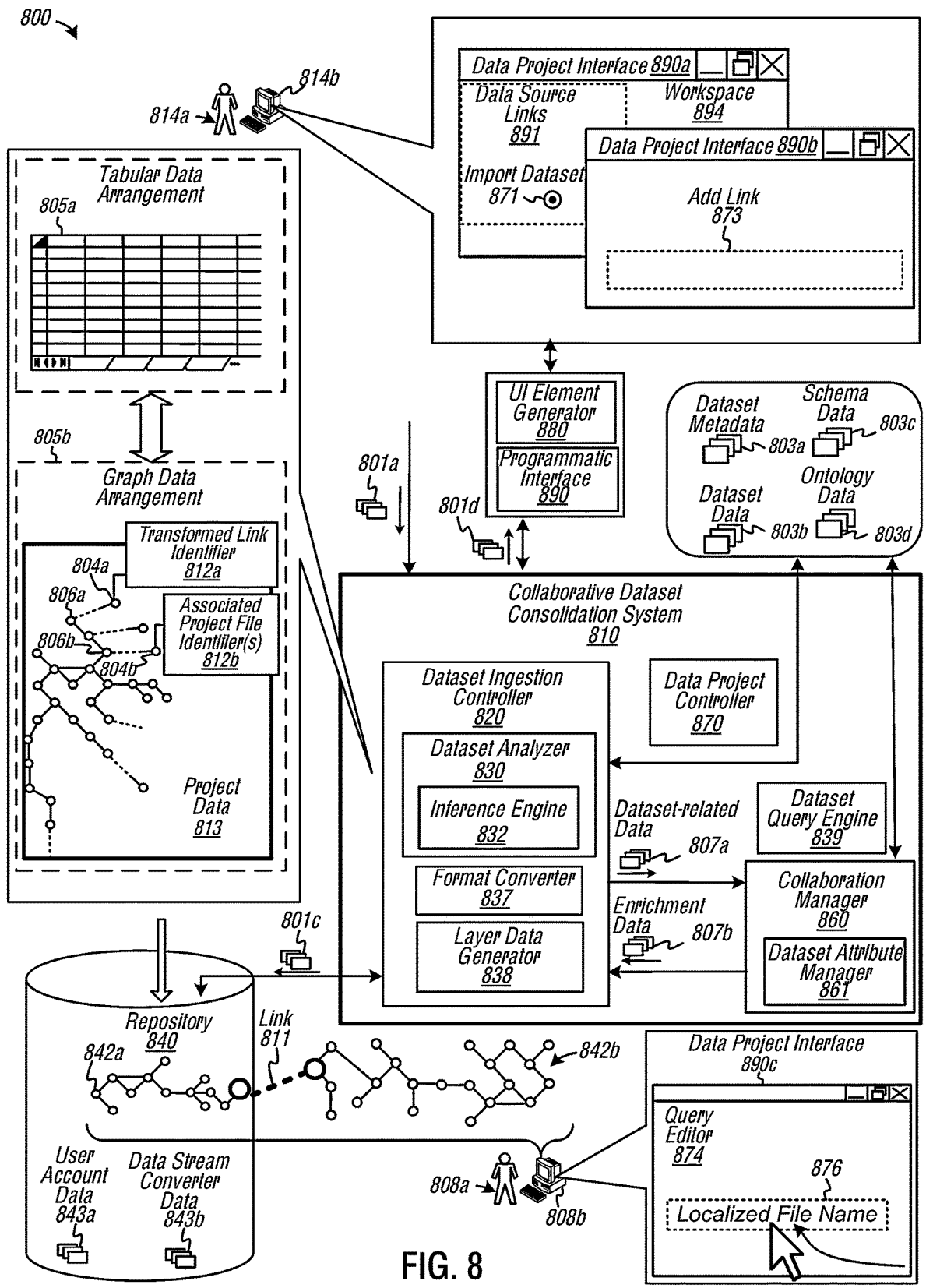
FIG. 8 is a diagram depicting an example of a data project controller configured to form data projects based on one or more datasets and a dataset query engine configured to implement multi-table queries, according to some embodiments.

FIG. 8 is a diagram depicting an example of a data project controller configured to form data projects based on one or more datasets and a dataset query engine configured to implement multi-table queries, according to some embodiments. Diagram 800 depicts an example of a collaborative dataset consolidation system 810 that may be configured to consolidate one or more datasets to form collaborative datasets as, for example, a canonical dataset. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets. In some examples, data project controller 870 may be configured to control creation and evolution of a data project for managing collaborative datasets. Also, data project controller 870 may also initiate importation (e.g., ingestion) of dataset 805*a* via dataset ingestion controller 820. Implementation of data project controller 870 to access, modify, or improve a data project may be activated via a user account associated with a computing device 814*b* (and/or user 814*a*). Data representing the user account may be disposed in repository 840 as user account data 843*a*. In this example, computing device 814*b* and user 814*a* may each be identified as a creator or "owner" of a dataset and/or a data project. However, initiation of data project controller 870 to access, modify, or improve a data project may originate via another user account associated with a computing device 808*b* (and/or user 808*a*), who, as a collaborator, may access datasets, queries, and other data associated with a data project to perform additional analysis and information augmentation.

Collaborative dataset consolidation system 810 may be configured to generate data for presentation in a display to form computerized tools in association with data project interface 890*a*, which is shown in this example to include a data source links 891 interface portion including a user input 871 to import a dataset. Further, data project interface 890*a* also may present an interactive workspace interface portion 894. Consider that computing device 814*b* may be configured to initiate importation of a dataset 805*a* (e.g., in a tabular data arrangement) into a data project as a dataset 805*b* (e.g., in a graph data arrangement). Data project interface 890*b* may be an interface portion configured to provide a user input to add a link 873 as a remote URL linked to a remote dataset for facilitating implicit query federation.

Dataset 805*a* may be ingested as data 801*a*, which may be received in the following examples of data formats: CSV, XML, JSON, XLS, MySQL, binary, free-form, unstructured data formats (e.g., data extracted from a PDF file using optical character recognition), etc., among others. Consider further that dataset ingestion controller 820 may receive data 801*a* representing a dataset 805*a*, which may be formatted as a "spreadsheet data file" that may include multiple tables associated with each tab of a spreadsheet. Dataset ingestion controller 820 may arrange data in dataset 805*a* into a first data arrangement, or may identify that data in dataset 805*a* is formatted in a particular data arrangement, such as in a first data arrangement. In this example, dataset 805*a* may be disposed in a tabular data arrangement that format converter 837 may convert into a second data arrangement, such as a graph data arrangement 805*b*. As such, data in a field (e.g., a unit of data in a cell at a row and column) of a table 805*a* may be disposed in association with a node in a graph 805*b* (e.g., a unit of data as linked data). A data operation (e.g., a query) may be applied as either a query against a tabular data arrangement (e.g., based on a relational data model) or graph data arrangement (e.g., based on a graph data model, such as using RDF). Since equivalent data are disposed in both a field of a table and a node of a graph, either the table or the graph may be used interchangeably to perform queries and other data operations. Similarly, a dataset disposed in one or more other graph data arrangements may be disposed or otherwise mapped (e.g., linked) as a dataset into a tabular data arrangement.

Collaborative dataset consolidation system 810 is shown in this example to include a dataset ingestion controller 820, a collaboration manager 860 including a dataset attribute manager 861, a dataset query engine 839 configured to manage queries, and a data project controller 870. Dataset ingestion controller 820 may be configured to ingest and convert datasets, such as dataset 805*a* (e.g., a tabular data arrangement) into another data format, such as into a graph data arrangement 805*b*. Collaboration manager 860 may be configured to monitor updates to dataset attributes and other changes to a data project, and to disseminate the updates to a community of networked users or participants. Therefore, users 814*a* and 808*a*, as well as any other user or authorized participant, may receive communications, such as in an interactive collaborative activity feed (not shown) to discover new or recently-modified dataset-related information in real-time (or near real-time). Thus, collaboration manager 860 and/or other portions of collaborative dataset consolidation system 810 may provide collaborative data and logic layers to implement a "social network" for datasets. Dataset attribute manager 861 may include logic configured to detect patterns in datasets, among other sources of data, whereby the patterns may be used to identify or correlate a subset of relevant datasets that may be linked or aggregated with a dataset. Linked datasets may form a collaborative dataset that may be enriched with supplemental information from other datasets. Dataset query engine 839 may be configured to receive a query to apply against a one or more datasets, which may include at least graph data arrangement 805*b*. In some examples, a query may be implemented as either a relational-based query (e.g., in an SQL-equivalent query language) or a graph-based query (e.g., in a SPARQL-equivalent query language), or a combination thereof. Further, a query may be implemented as either an implicit federated query or an explicit federated query.

According to some embodiments, a data project may be implemented as an augmented dataset (e.g., project data 813) including supplemental data, including as one or more transformed link identifiers 812*a* or one or more associated project file identifiers 812*b*. One or more transformed link identifiers 812*a* may include transformed link identifiers that include transformed dataset names or locations that are transformed from a global namespace into a local namespace. Examples of transformed link identifiers 812*a* are described in FIGS. 5 to 7, among others. A transformed link identifier 812*a* may be linked to a graph data arrangement 805*b* between nodes 804*a* and 806*a*. One or more associated project file identifiers 812*b* may include data representing other dataset identifiers (e.g., identifiers set forth in data source links 891), whereby a collection of linked dataset identifiers may constitute the data associated with a data project, according to at least one example. An example of another linked dataset identifier relates to dataset 842*b*, which may be linked via link 811 to graph data arrangement 805*b*. Note that graph data arrangement 805*b* may be stored as dataset 842*a* in repository 840. One or more associated project file identifiers 812*b* may be linked to a graph data arrangement 805*b* between nodes 804*b* and 806*b*.

In at least one example, a collaborative user 808*a* may access via a computing device 808*b* a data project interface 890*c* in which computing device 808*b* may activate a user input 876 to include a localized link identifier 876 as an input into query editor 874. For example, localized link identifier 876 may be included as a data pattern or other indicator with which an extended FROM clause or command may operate upon to extract data from multiple datasets in a multi-table query.

Note that in some examples, an insight or related insight information may include, at least in some examples, information that may automatically convey (e.g., visually in text and/or graphics) dataset attributes of a created dataset or analysis of a query, including dataset attributes and derived dataset attributes, during or after (e.g., shortly thereafter) the creation or querying of a dataset. In some examples, insight information may be presented as dataset attributes in a user interface (e.g., responsive to dataset creation) may describe various aspects of a dataset, such as dataset attributes, in summary form, such as, but not limited to, annotations (e.g., metadata or descriptors describing columns, cells, or any portion of data), data classifications (e.g., a geographical location, such as a zip code, etc.), datatypes (e.g., string, numeric, categorical, boolean, integer, etc.), a number of data points, a number of columns, a "shape" or distribution of data and/or data values, a number of empty or non-empty cells in a tabular data structure, a number of non-conforming data (e.g., a non-numeric data value in column expecting a numeric data, an image file, etc.) in cells of a tabular data structure, a number of distinct values, as well as other dataset attributes.

Dataset analyzer 830 may be configured to analyze data file 801*a*, as an ingested dataset 805*a*, to detect and resolve data entry exceptions (e.g., whether a cell is empty or includes non-useful data, whether a cell includes non-conforming data, such as a string in a column that otherwise includes numbers, whether an image embedded in a cell of a tabular file, whether there are any missing annotations or column headers, etc.). Dataset analyzer 830 then may be configured to correct or otherwise compensate for such exceptions. Dataset analyzer 830 also may be configured to classify subsets of data (e.g., each subset of data as a column of data) in data file 801*a* representing tabular data arrangement 805*a* as a particular data classification, such as a particular data type or classification. For example, a column of integers may be classified as "year data," if the integers are formatted similarly as a number of year formats expressed in accordance with a Gregorian calendar schema. Thus, "year data" may be formed as a derived dataset attribute for the particular column. As another example, if a column includes a number of cells that each includes five digits, dataset analyzer 830 also may be configured to classify the digits as constituting a "zip code."

In some examples, an inference engine 832 of dataset analyzer 830 can be configured to analyze data file 801*a* to determine correlations among dataset attributes of data file 801*a* and other datasets 842*b* (and dataset attributes, such as metadata 803*a*). Once a subset of correlations has been determined, a dataset formatted in data file 801*a* (e.g., as an annotated tabular data file, or as a CSV file) may be enriched, for example, by associating links between tabular data arrangement 805*a* and other datasets (e.g., by joining with, or linking to, other datasets) to extend the data beyond that which is in data file 801*a*. In one example, inference engine 832 may analyze a column of data to infer or derive a data classification for the data in the column. In some examples, a datatype, a data classification, etc., as well any dataset attribute, may be derived based on known data or information (e.g., annotations), or based on predictive inferences using patterns in data.

Further to diagram 800, format converter 837 may be configured to convert dataset 805*a* into another format, such as a graph data arrangement 842*a*, which may be transmitted as data 801*c* for storage in data repository 840. Graph data arrangement 842*a* in diagram 800 may be linkable (e.g., via links 811) to other graph data arrangements to form a collaborative dataset. Also, format converter 837 may be configured to generate ancillary data or descriptor data (e.g., metadata) that describe attributes associated with each unit of data in dataset 805*a*. The ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement (e.g., originating from a cell in dataset 805*a*). In some cases, ancillary or descriptor data may be used by inference engine 832 to determine whether data may be classified into a certain classification, such as where a column of data includes "zip codes."

Layer data generator 836 may be configured to form linkage relationships of ancillary data or descriptor data to data in the form of "layers" or "layer data files." Implementations of layer data files may facilitate the use of supplemental data (e.g., derived or added data, etc.) that can be linked to an original source dataset, whereby original or subsequent data may be preserved. As such, format converter 837 may be configured to form referential data (e.g., IRI data, etc.) to associate a datum (e.g., a unit of data) in a graph data arrangement to a portion of data in a tabular data arrangement. Thus, data operations, such as a query, may be applied against a datum of the tabular data arrangement as the datum in the graph data arrangement. An example of a layer data generator 836, as well as other components of collaborative dataset consolidation system 810, may be as described in U.S. patent application Ser. No. 15/927,004, filed on Mar. 20, 2018, titled "LAYERED DATA GENERATION AND DATA REMEDIATION TO FACILITATE FORMATION OF INTERRELATED DATA IN A SYSTEM OF NETWORKED COLLABORATIVE DATASETS."

According to some embodiments, a collaborative data format may be configured to, but need not be required to, format converted dataset 805*a* into an atomized dataset. An atomized dataset may include a data arrangement in which data is stored as an atomized data point that, for example, may be an irreducible or simplest data representation (e.g., a triple is a smallest irreducible representation for a binary relationship between two data units) that are linkable to other atomized data points, according to some embodiments. As atomized data points may be linked to each other, data arrangement 842*a* may be represented as a graph, whereby converted dataset 805*a* (i.e., atomized dataset 805*b*) may form a portion of a graph. In some cases, an atomized dataset facilitates merging of data irrespective of whether, for example, schemas or applications differ. Further, an atomized data point may represent a triple or any portion thereof (e.g., any data unit representing one of a subject, a predicate, or an object), according to at least some examples.

As further shown, collaborative dataset consolidation system 810 may include a dataset attribute manager 861. Dataset ingestion controller 820 and dataset attribute manager 861 may be communicatively coupled to dataset ingestion controller 820 to exchange dataset-related data 807*a* and enrichment data 807*b*, both of which may exchange data from a number of sources (e.g., external data sources) that may include dataset metadata 803*a* (e.g., descriptor data or information specifying dataset attributes), dataset data 803*b* (e.g., some or all data stored in system repositories 840, which may store graph data), schema data 803*c* (e.g., sources, such as schema.org, that may provide various types and vocabularies), ontology data 803*d* from any suitable ontology and any other suitable types of data sources. One or more elements depicted in diagram 800 of FIG. 8 may include structures and/or functions as similarly-named or similarly-numbered elements depicted in other drawings, or as otherwise described herein, in accordance with one or more examples. Dataset attribute manager 861 may be configured to monitor changes in dataset data and/or attributes, including user account attributes. As such, dataset attribute manager 860 may monitor dataset attribute changes, such as a change in number or identity of users sharing a dataset, as well as whether a dataset has been created, modified, linked, updated, associated with a comment, associated with a request, queried, or has been associated with any other dataset interactions. Dataset attribute manager 861 may also monitor and correlate data among any number of datasets, some other examples of dataset attributes described herein.

In the example shown if FIG. 8, dataset ingestion controller 820 may be communicatively coupled to a user interface, such as data project interface 890*a*, via one or both of a user interface ("UI") element generator 880 and a programmatic interface 890 to exchange data and/or commands (e.g., executable instructions) for facilitating data project modification to include dataset 805*a*. UI element generator 880 may be configured to generate data representing UI elements to facilitate the generation of data project interfaces 890*a* and 890*b* and graphical elements thereon. For example, UI generator 880 may cause generation UI elements, such as a container window (e.g., icon to invoke storage, such as a file), a browser window, a child window (e.g., a pop-up window), a menu bar (e.g., a pull-down menu), a context menu (e.g., responsive to hovering a cursor over a UI location), graphical control elements (e.g., user input buttons, check boxes, radio buttons, sliders, etc.), and other control-related user input or output UI elements. In some examples, a data project interface, such as data project interface 890*a* or data project interface 890*b*, may be implemented as, for example, a unitary interface window in which multiple user inputs may provide access to numerous aspects of forming or managing a data project, according to a non-limiting example.

Programmatic interface 890 may include logic configured to interface collaborative dataset consolidation system 810 and any computing device configured to present data ingestion interface 802 via, for example, any network, such as the Internet. In one example, programmatic interface 890 may be implemented to include an applications programming interface ("API") (e.g., a REST API, etc.) configured to use, for example, HTTP protocols (or any other protocols) to facilitate electronic communication. In one example, programmatic interface 890 may include a web data connector, and, in some examples, may include executable instructions to facilitate data exchange with, for example, a third-party external data analysis computerized tool. A web connector may include data stream converter data 843*b*, which, for example, may include HTML code to couple a user interface 890*a* with an external computing device to Examples of external applications and/or programming languages to perform external statistical and data analysis include "R," which is maintained and controlled by "The R Foundation for Statistical Computing" at www(dot)r-project(dot)org, as well as other like languages or packages, including applications that may be integrated with R (e.g., such as MATLAB™, Mathematica™, etc.). Or, other applications, such as Python programming applications, MATLAB™, Tableau® application, etc., may be used to perform further analysis, including visualization or other queries and data manipulation.

According to some examples, user interface ("UI") element generator 880 and a programmatic interface 890 may be implemented in association with collaborative dataset consolidation system 810, in a computing device associated with data project interfaces 890*a* and 890*b*, or a combination thereof. UI element generator 880 and/or programmatic interface 890 may be referred to as computerized tools, or may facilitate presentation of data 801*d* to form data project interface 890*a*, or the like, as a computerized tool, according to some examples.

In at least one example, additional datasets to enhance dataset 842*a* may be determined through collaborative activity, such as identifying that a particular dataset may be relevant to dataset 842*a* based on electronic social interactions among datasets and users. For example, data representations of other relevant dataset to which links may be formed may be made available via an interactive collaborative dataset activity feed. An interactive collaborative dataset activity feed may include data representing a number of queries associated with a dataset, a number of dataset versions, identities of users (or associated user identifiers) who have analyzed a dataset, a number of user comments related to a dataset, the types of comments, etc.). Thus, dataset 842*a* may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets."

According to various embodiments, one or more structural and/or functional elements described in FIG. 8 or herein may be implemented in hardware or software, or both. Examples of one or more structural and/or functional elements described herein may be implemented as set forth in one or more of U.S. patent application Ser. No. 15/186,514, filed on Jun. 19, 2016, titled "COLLABORATIVE DATASET CONSOLIDATION VIA DISTRIBUTED COMPUTER NETWORKS," U.S. patent application Ser. No. 15/186,517, filed on Jun. 19, 2016, titled "QUERY GENERATION FOR COLLABORATIVE DATASETS," and U.S. patent application Ser. No. 15/454,923, filed on Mar. 9, 2017, titled "COMPUTERIZED TOOLS TO DISCOVER, FORM, AND ANALYZE DATASET INTERRELATIONS AMONG A SYSTEM OF NETWORKED COLLABORATIVE DATASETS," each of which is herein incorporated by reference.

Figure 9:
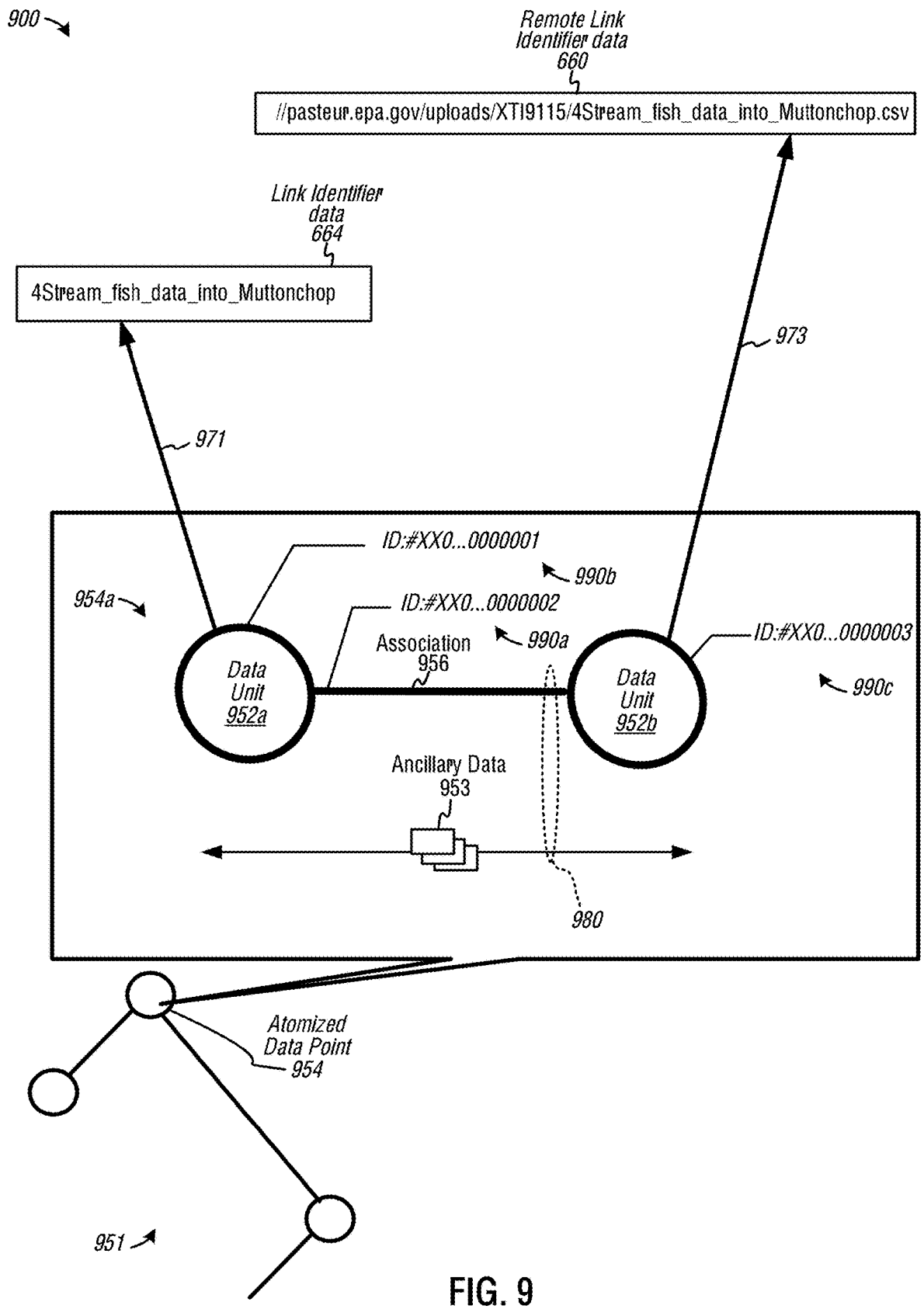
FIG. 9 is a diagram depicting an example of an atomized data point, according to some embodiments.

FIG. 9 is a diagram depicting an example of an atomized data point, according to some embodiments. In some examples, an atomized dataset may be formed by converting a tabular data format into a format associated with the atomized dataset. In some cases, portion 951 of an atomized dataset can describe a portion of a graph that includes one or more subsets of linked data. Further to diagram 900, one example of atomized data point 954 is shown as a data representation 954*a*, which may be represented by data representing two data units 952*a* and 952*b* (e.g., objects) that may be associated via data representing an association 956 with each other. One or more elements of data representation 954*a* may be configured to be individually and uniquely identifiable (e.g., addressable), either locally or globally in a namespace of any size. For example, elements of data representation 954*a* may be identified by identifier data 990*a*, 990*b*, and 990*c* (e.g., URIs, URLs, IRIs, etc.).

Diagram 900 depicts a portion 951 of an atomized dataset that includes an atomized data point 954*a*, which includes links formed to facilitate implicit query federation. In this example, atomized data point 954*a* and/or its constituent components may facilitate formation of a localized link identifier 664 in a local namespace based on a remote link identifier 660, which may be a URL providing a qualified path in a global namespace. The data representing the identifiers may be disposed within a corresponding graph data arrangement based on a graph data model. In diagram 900, at least localized link identifier 664 may be linked to node 952*a*, which, in turn, may be linked via link 973 to remote link identifier 660. Based on the foregoing linked data and relationships, localized link identifier 664 may be used in a local namespace to perform federated queries over multiple local and remote data sets implicitly. Any of links 971 and 973 may be removed if a corresponding dataset identifier is disassociated from a data project. In some examples, removal of one of links 971 and 973 generates a new version of a data project, whereby the removed link may be preserved for at least archival purposes. Note, too, that while a first entity (e.g., a dataset owner) may exert control and privileges over portion 951 of an atomized dataset that includes atomized data point 954, a collaborator-user or a collaborator-computing device may form any of links 971 and 973. In one example, data units 952*a* and 952*b* may represent any of node pairs 804*a* and 806*a* or 804*b* and 806*b* in FIG. 8, according to at least one implementation.

In some embodiments, atomized data point 954*a* may be associated with ancillary data 953 to implement one or more ancillary data functions. For example, consider that association 956 spans over a boundary between an internal dataset, which may include data unit 952a, and an external dataset (e.g., external to a collaboration dataset consolidation), which may include data unit 952b. Ancillary data 953 may interrelate via relationship 980 with one or more elements of atomized data point 954a such that when data operations regarding atomized data point 954a are implemented, ancillary data 953 may be contemporaneously (or substantially contemporaneously) accessed to influence or control a data operation. In one example, a data operation may be a query and ancillary data 953 may include data representing authorization (e.g., credential data) to access atomized data point 954a at a query-level data operation (e.g., at a query proxy during a query). Thus, atomized data point 954a can be accessed if credential data related to ancillary data 953 is valid (otherwise, a request to access atomized data point 954a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 990a, 990b, and 990c. Ancillary data 953 may be disposed in other data portion of atomized data point 954a, or may be linked (e.g., via a pointer) to a data vault that may contain data representing access permissions or credentials.

Atomized data point 954a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 954a may be expressed in accordance with Turtle (e.g., Terse RDF Triple Language), RDF/XML, N-Triples, N3, or other like RDF-related formats. As such, data unit 952a, association 956, and data unit 952b may be referred to as a "subject," "predicate," and "object," respectively, in a "triple" data point (e.g., as linked data). In some examples, one or more of identifier data 990a, 990b, and 990c may be implemented as, for example, a Uniform Resource Identifier ("URI"), the specification of which is maintained by the Internet Engineering Task Force ("IETF"). According to some examples, credential information (e.g., ancillary data 953) may be embedded in a link or a URI (or in a URL) or an Internationalized Resource Identifier ("IRI") for purposes of authorizing data access and other data processes. Therefore, an atomized data point 954 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (or portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STAR-DOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, MD, U.S.A.), and the like.

Figure 10:
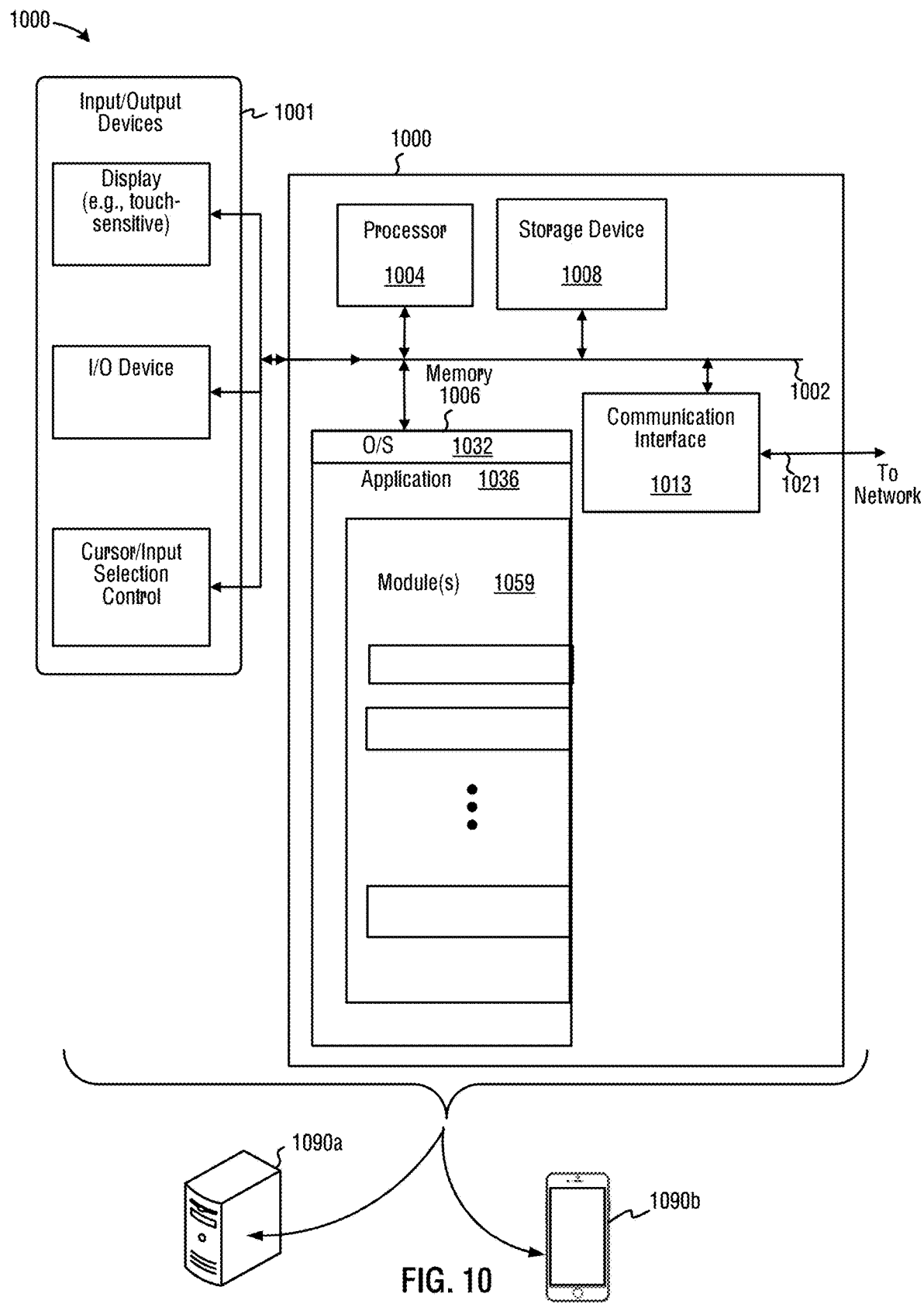
FIG. 10 illustrates examples of various computing platforms configured to provide various functionalities to any of one or more components of a collaborative dataset consolidation system, according to various embodiments.

FIG. 10 illustrates examples of various computing platforms configured to provide various functionalities to any of one or more components of a collaborative dataset consolidation system, according to various embodiments. In some examples, computing platform 1000 may be used to implement computer programs, applications, methods, processes, algorithms, or other software, as well as any hardware implementation thereof, to perform the above-described techniques.

In some cases, computing platform 1000 or any portion (e.g., any structural or functional portion) can be disposed in any device, such as a computing device 1090a, mobile computing device 1090b, and/or a processing circuit in association with initiating the formation of collaborative datasets, as well as querying multi-table datasets via user interfaces and user interface elements, according to various examples described herein.

Computing platform 1000 includes a bus 1002 or other communication mechanism for communicating information, which interconnects subsystems and devices, such as processor 1004, system memory 1006 (e.g., RAM, etc.), storage device 1008 (e.g., ROM, etc.), an in-memory cache (which may be implemented in RAM 1006 or other portions of computing platform 1000), a communication interface 1013 (e.g., an Ethernet or wireless controller, a Bluetooth controller, NFC logic, etc.) to facilitate communications via a port on communication link 1021 to communicate, for example, with a computing device, including mobile computing and/or communication devices with processors, including database devices (e.g., storage devices configured to store atomized datasets, including, but not limited to triplestores, etc.). Processor 1004 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1000 exchanges data representing inputs and outputs via input-and-output devices 1001, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 1001 may be implemented as, or otherwise substituted with, a user interface in a computing device associated with a user account identifier in accordance with the various examples described herein.

According to some examples, computing platform 1000 performs specific operations by processor 1004 executing one or more sequences of one or more instructions stored in system memory 1006, and computing platform 1000 can be implemented in a client-server arrangement, peer-to-peer arrangement, or as any mobile computing device, including smart phones and the like. Such instructions or data may be read into system memory 1006 from another computer readable medium, such as storage device 1008, or any other data storage technologies, including blockchain-related techniques. In some examples, hard-wired circuitry may be used in place of or in combination with software instructions for implementation. Instructions may be embedded in software or firmware. The term "computer readable medium" refers to any tangible medium that participates in providing instructions to processor 1004 for execution. Such a medium may take many forms, including but not limited to, non-volatile media and volatile media. Non-volatile media includes, for example, optical or magnetic disks and the like. Volatile media includes dynamic memory, such as system memory 1006.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1002 for transmitting a computer data signal.

In some examples, execution of the sequences of instructions may be performed by computing platform 1000. According to some examples, computing platform 1000 can be coupled by communication link 1021 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1000 may transmit and receive messages, data, and instructions, including program code (e.g., application code) through communication link 1021 and communication interface 1013. Received program code may be executed by processor 1004 as it is received, and/or stored in memory 1006 or other non-volatile storage for later execution.

In the example shown, system memory 1006 can include various modules that include executable instructions to implement functionalities described herein. System memory 1006 may include an operating system ("O/S") 1032, as well as an application 1036 and/or logic module(s) 1059. In the example shown in FIG. 10, system memory 1006 may include any number of modules 1059, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including Python™, ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc. The described techniques may be varied and are not limited to the embodiments, examples or descriptions provided.

As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 1059 of FIG. 10, or one or more of their components, or any process or device described herein, can be in communication (e.g., wired or wirelessly) with a mobile device, such as a mobile phone or computing device, or can be disposed therein. In some cases, a mobile device, or any networked computing device (not shown) in communication with one or more modules 1059 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
receiving data representing one or more characters to implement a multi-table syntax based on a computerized query language syntax;
identifying a portion of multiple file identifiers including a data pattern associated with each of the datasets;
implementing one or more variable characters as variable for the portion of multiple file identifiers;
detecting one or more explicit selections to target subsets of data in the subset of datasets that otherwise is implemented in accordance with a first query command;
implementing the one or more explicit selections to target any subsets of data in association with a second query command;
applying a query based on the first query command and the second query command to a subset of datasets, at least one subset of the datasets formatted as a triple-based dataset; and
executing instructions to access data from multiple tabular data arrangements responsive to identification of the multiple tabular data arrangements in-situ in query formation.

2. The method of claim 1 further comprising:
forming a query including either the first or the second query command implementing an extended query command.

3. The method of claim 2 further comprising:
performing the query in-situ at a point in time at which the query is identified.

4. The method of claim 1 further comprising:
applying a query based on the first query command and the second query command to a subset of datasets, at least one subset of the datasets including a graph data arrangement.

5. The method of claim 1 wherein the query is performed responsive to identifying multiple tabular data arrangements in-situ at a point in time at which the query is written or formed.

6. The method of claim 1 further comprising:
forming a query via a data project interface responsive to data presented at a remote computing interface.

7. The method of claim 1 wherein the implementing the one or more variable characters comprises:
implementing a string of characters.

8. The method of claim 1 further comprising:
mapping data values between at least one ingested tabular data arrangement and a graph data arrangement to identify datasets as blocks of data.

9. The method of claim 8 further comprising:
rewriting a relational-based query to include a graph-based query,
wherein at least one of the first query command and the second query command is implemented as one of the relational-based query and the graph-based query.

10. A system comprising:
a memory configured to store executable instructions to implement computerized tools including a data project interface; and
a processor configured to execute at least a subset of the instructions, the processor configured to:
receive data representing one or more characters to implement a multi-table syntax based on a computerized query language syntax;
identify a portion of multiple file identifiers including a data pattern associated with each of the datasets;
implement one or more variable characters as variable for the portion of multiple file identifiers;
detect one or more explicit selections to target subsets of data in the subset of datasets that otherwise is implemented in accordance with a first query command;
implement the one or more explicit selections to target any subsets of data in association with a second query command;
apply a query based on the first query command and the second query command to a subset of datasets, at least one subset of the datasets formatted as a triple-based dataset; and
execute the subset of the instructions to access data from multiple tabular data arrangements responsive to identification of the multiple tabular data arrangements in-situ in query formation.

11. The system of claim 10, wherein the processor is further configured to:
form a query including either the first or the second query command implementing an extended query command.

12. The system of claim 11, wherein the processor is further configured to:
perform the query in-situ at a point in time at which the query is identified.

13. The system of claim 10, wherein the processor is further configured to:
apply a query based on at least one of the first query command and the second query command to a subset of datasets, at least one subset of the datasets formatted as a triple-based dataset.

14. The system of claim 10, wherein the processor is further configured to:
apply a query based on at least one of the first query command and the second query command to a subset of datasets, at least one subset of the datasets including a graph data arrangement.

15. The system of claim 10 wherein the query is performed responsive to identifying multiple tabular data arrangements in-situ at a point in time at which the query is written or formed.

16. The system of claim 10, wherein the processor is further configured to:
form a query via a data project interface responsive to data presented at a remote computing interface.

17. The system of claim 10 wherein the processor configured to implement the one or more variable characters is further configured to:
implement a string of characters.

18. The system of claim 10, wherein the processor is further configured to:

map data values between at least one ingested tabular data arrangement and a graph data arrangement to identify datasets as blocks of data.

19. The system of claim 18, wherein the processor is further configured to:

rewrite a relational-based query to include a graph-based query, wherein at least one of the first query command and the second query command is implemented as one of the relational-based query and the graph-based query.

* * * * *